(12) United States Patent
Kohl et al.

(10) Patent No.: US 12,239,949 B2
(45) Date of Patent: Mar. 4, 2025

(54) CONTINUOUS FLOW PROCESS FOR PREPARING CONDUCTING POLYMERS

(71) Applicants: THE BOEING COMPANY, Arlington, VA (US); Commonwealth Scientific and Industrial Research Organisation, Acton (AU)

(72) Inventors: Thomas Kohl, Acton (AU); John Tsanaktsidis, Acton (AU); Christian Hornung, Acton (AU); Patrick Kinlen, Fenton, MO (US); Eric Bruton, St. Louis, MO (US); Matthew Flack, St. Louis, MO (US); Andrew Zweig, Akron, OH (US)

(73) Assignees: The Boeing Company, Arlington, VA (US); Commonwealth Scientific and Industrial Research Organisation, Acton (AU)

(*) Notice: Subject to any disclaimer, the term of this patent is extended or adjusted under 35 U.S.C. 154(b) by 93 days.

(21) Appl. No.: 18/349,910

(22) Filed: Jul. 10, 2023

(65) Prior Publication Data
US 2024/0066491 A1    Feb. 29, 2024

Related U.S. Application Data

(63) Continuation of application No. 17/380,088, filed on Jul. 20, 2021, now Pat. No. 11,738,320, which is a
(Continued)

(51) Int. Cl.
*B01J 19/00* (2006.01)
*B01J 19/18* (2006.01)
(Continued)

(52) U.S. Cl.
CPC ....... *B01J 19/0013* (2013.01); *B01J 19/1812* (2013.01); *C08G 61/126* (2013.01);
(Continued)

(58) Field of Classification Search
USPC .......................................... 528/380, 422, 423
See application file for complete search history.

(56) References Cited

U.S. PATENT DOCUMENTS

| 5,324,453 A | 6/1994 | Cao et al. |
|---|---|---|
| 5,567,356 A | 10/1996 | Kinlen |

(Continued)

FOREIGN PATENT DOCUMENTS

| CN | 103221435 A | 7/2013 |
|---|---|---|
| CN | 106563400 A | 4/2017 |

(Continued)

OTHER PUBLICATIONS

PCT Notification of Transmittal of International Preliminary Report on Patentability (Chapter II of the Patent Cooperation Treaty) PCT/AU2018/051324 Apr. 14, 2020 pp. 1-24.
(Continued)

*Primary Examiner* — Fred M Teskin
(74) *Attorney, Agent, or Firm* — Walters & Wasylyna LLC

(57) ABSTRACT

The present disclosure relates to a continuous flow process for preparing conducting polymers, for example polyaniline. The continuous flow process can provide a controlled synthesis of a conducting polymer from an emulsion comprising a polymerizable organic monomer and a free radical initiator in flow within a temperature controlled continuous flow reactor comprising at least one mixing element. The present disclosure also relates to the conducting polymers prepared by the continuous flow process.

20 Claims, 6 Drawing Sheets

Related U.S. Application Data continuation of application No. 16/772,276, filed as application No. PCT/AU2018/051324 on Dec. 12, 2018, now Pat. No. 11,065,594.

(60) Provisional application No. 62/660,552, filed on Apr. 20, 2018, provisional application No. 62/597,808, filed on Dec. 12, 2017.

(51) Int. Cl.
  *C08G 61/12* (2006.01)
  *C08G 73/02* (2006.01)
  *C08K 5/01* (2006.01)
  *C08K 5/14* (2006.01)
  *C08K 5/42* (2006.01)

(52) U.S. Cl.
  CPC ............ *C08G 73/0266* (2013.01); *C08K 5/01* (2013.01); *C08K 5/14* (2013.01); *C08K 5/42* (2013.01); *B01J 2219/00033* (2013.01); *B01J 2219/00063* (2013.01); *B01J 2219/00099* (2013.01); *B01J 2219/00162* (2013.01); *B01J 2219/00164* (2013.01)

(56) References Cited

U.S. PATENT DOCUMENTS

| | | |
|---|---|---|
| 6,271,320 B1 | 8/2001 | Keller et al. |
| 6,509,502 B1 | 1/2003 | Jussila et al. |
| 6,593,399 B1 | 7/2003 | La Fleur et al. |
| 9,481,764 B1 | 11/2016 | Kinlen et al. |
| 11,065,594 B2 * | 7/2021 | Kohl .................... B01J 19/0013 |
| 2007/0249803 A1 | 10/2007 | Mattes et al. |
| 2017/0321010 A1 | 11/2017 | Kinlen et al. |
| 2020/0325276 A1 | 10/2020 | Kinlen et al. |

FOREIGN PATENT DOCUMENTS

| | | |
|---|---|---|
| EP | 3717582 A1 | 10/2020 |
| JP | H07509743 A | 10/1995 |
| JP | 2000186218 A | 7/2000 |
| JP | 20030529651 A | 10/2003 |
| JP | 2003-535201 A | 11/2003 |
| JP | 2017110181 A | 6/2017 |
| KR | 10-2017-0043456 A | 4/2017 |
| WO | 9403528 A1 | 2/1994 |
| WO | 0174926 A1 | 10/2001 |
| WO | 2019113640 A1 | 6/2019 |

OTHER PUBLICATIONS

PCT Written Opinion of the International Searching Authority, Application: PCT/AU2018/051324 Feb. 5, 2019 pp. 1-6.
Kinlen , et al., "Emulsion Polymerization Process for Organically Soluble and Electrically Conducting Polyaniline," Macromolecules 1998, 31, 1735-1744. (Year: 1998).
Anonymous: "Conductive polymer", May 9, 2021 (May 9, 2021), pp. 1-9, XP055831813, <https://en.wikipedia.org/wiki/Conductive_polymer>.
Nezakati Toktam et al: "Conductive Polymers: Opportunities and Challenges in Biomedical Applications", Chemical Reviews, vol. 118, No. 14, Jul. 25, 2018 (Jul. 25, 2018), pp. 6766-6843, XP055831810, <https://pubs.acs.org/doi/pdf/10.1021/acs.chemrev.6b00275.
Anonymous: "Aniline", Aug. 12, 2021 (Aug. 12, 2021), pp. 1-13, XP055831859, <https://en.wikipedia.org/wiki/Aniline.
Kim et al: "Synthesis and characterization of organic soluble polyaniline prepared by one-step emulsion polymerization", Current Applied Physics, Elsevier, Amsterdam, NL, vol. 7, No. 2, Nov. 11, 2006 (Nov. 11, 2006), pp. 205-210, XP005761088.
European Patent Office, Extended European Search Report for Application 18887656.9 dated Aug. 23, 2021.
Chinese Patent Office, Chinese First Office Action for Application 201880088406.6 dated Oct. 10, 2022.
Japenese Patent Office, Notice of Reasons for Rejection for Application 2020-532767 dated Dec. 20, 2022.
Japanese Patent Office, Notice of Reasons for Rejection for Application 2020-532767 dated Jul. 18, 2023.
Korean Patent Office, Office Action for Korean Patent Application No. 10-2020-7020106, dated Dec. 22, 2023.
Australian Government, Examination Report No. 1 for Standard Patent Application 2018384081 dated Nov. 6, 2023.

* cited by examiner

CONTINUOUS FLOW PROCESS FOR PREPARING CONDUCTING POLYMERS

CROSS-REFERENCE TO RELATED APPLICATIONS

The present application is a continuation application that claims priority to, and the benefit of the filing date of, U.S. patent application Ser. No. 17/380,088, filed Jul. 20, 2020, now U.S. Pat. No. 11,738,320, which is a continuation of U.S. Pat. No. 11,065,594, filed on Jun. 12, 2020, which is a national stage application of PCT/AU2018/051324, filed on Dec. 12, 2018, which claims benefit of and priority to U.S. Provisional Patent Application No. 62/660,552, filed on Apr. 20, 2018, and benefit of and priority to U.S. Provisional Patent Application No. 62/597,808, filed on Dec. 12, 2017, the entirety of which are incorporated herein by reference.

FIELD

The present disclosure relates to a continuous flow process for preparing conducting polymers, for example a continuous flow process for synthesising polyaniline. The present disclosure also relates to the conducting polymers prepared by the continuous flow process, further products comprising the conducting polymers or prepared therefrom.

BACKGROUND

Conducting polymers are of significant commercial value although the scalability of processes for preparing conducting polymers is still considerably limited because of various issues including solubility and reaction control requirements. For example, polyaniline is a conducting polymer that has attracted considerable attention because of its environmental stability and range of industrial applications. Polyaniline is unique among conducting polymers in that its conductivity can be reversibly controlled either electrochemically (by oxidation/reduction) or chemically (by protonation/deprotonation). Applications of polyaniline include electrostatic dissipative coatings, anticorrosion coatings, electrochromic coatings, and chemical sensors.

Synthesis of polyaniline is commonly performed by chemical oxidative polymerization in aqueous solutions. The method involves batch reactions that combine water, aniline, a protonic acid, and an oxidizing agent and allowing the mixture to react while maintaining the reaction mixture at low temperature (normally about 5° C.). Material synthesized by this approach is predominately amorphous, intractable, and insoluble in most organic solvents. Organically soluble polyaniline can also be synthesized in batch-wise emulsion polymerization processes in Butyl CELLOSOLVE™/water with organically soluble dopants such as dinonylnaphthalenesulfonic acid. Although polymers of reasonable molecular weights can be obtained, the emulsion polymerization reaction is highly exothermic and requires careful control to reduce the formation of lower molecular weight by-products. The oxidation reaction in the batch-wise emulsion polymerization processes problematically introduces an exothermic temperature spike that contributes to reducing molecular weights and conductance properties in the prepared polyaniline along with increasing impurities such as low molecular weight oligomers. Batch-wise emulsion polymerization processes also suffer from scalability for industrial applications. However, industrial processes for preparing conducting polymers have been avoided in view of poor reaction performance and control issues in forming the conducting polymers. Batch-wise emulsion polymerization processes have therefore been extensively favoured, particularly for the preparation of polyaniline.

Consequently, there is a need for developing alternative commercial processes that are industrially scalable for preparing and synthesising various conducting polymers including polyaniline.

SUMMARY

The present inventors have identified an alternative method for preparing various conducting polymers involving a continuous flow process.

The continuous flow process comprises providing an emulsion of a polymerizable organic monomer, a protonic acid and a free radical initiator in a temperature controlled continuous flow reactor. The reactor can comprise at least one mixing element. The temperature can be controlled to be effective for synthesising the conducting polymer or salt thereof to provide a product stream comprising the conducting polymer or salt thereof. The continuous flow process can comprise a continuous flow reactor comprising one or more passages in fluidic communication for carrying the reactant and product streams, for example a continuous flow tubular reactor. The present continuous flow process according to at least some examples as described herein can provide for any one or more of precise variable control of reagent proportions to control final product molecular weights, solubility and thermal stability, addition of dopants after polymerization to enhance conductivity, use of increased concentrations of organic monomers, better scalability and industrial processing, and/or improved control over temperatures during processing, which can prevent or reduce undesirable fluctuations in temperature that can contribute to impurities or undesirable by-products being introduced into the product stream.

The continuous flow process may also comprise providing a continuous flow of an organic stream comprising a polymerizable organic monomer in an organic solvent. The organic stream can be mixed with one or more other streams to initiate polymerization of the organic monomer. For example, an oxidant stream comprising a free radical initiator can be mixed with an organic stream comprising an aniline monomer to initiate polymerisation of the aniline monomer to form a polyaniline. The polymerizable organic monomer can be converted in-situ during the continuous flow process into an organic solvent soluble salt prior to its polymerization with a free radical initiator into a conducting polymer, for example an organic soluble conducting polymer salt that is more readily processable.

In one aspect, there is provided a continuous flow process for controlled synthesis of a conducting polymer or salt thereof, comprising providing an emulsion of a polymerizable organic monomer, optionally a protonic acid, and a free radical initiator, in a temperature controlled continuous flow reactor comprising at least one mixing element, at a temperature effective for synthesising the conducting polymer or salt thereof to provide a product stream comprising the conducting polymer or salt thereof.

In one example, the emulsion comprises the polymerizable organic monomer, the protonic acid, and the free radical initiator. In another example, the emulsion is formed using an organic stream comprising the polymerizable organic monomer and an aqueous stream. In another example, the emulsion is formed using an organic stream comprising the polymerizable organic monomer and the protonic acid and an aqueous stream. It will be appreciated that the organic stream may be mixed with an aqueous stream to form a product stream. It will be appreciated that the aqueous stream for forming the product stream comprises the free radical initiator.

The emulsion may comprises either i) the polymerizable organic monomer, a protonic acid, and the free radical initiator, or ii) an organic monomer salt of an organic monomer and a protonic acid, and the free radical initiator.

In another example, the emulsion is formed using the organic stream comprising the polymerizable organic monomer and an oxidant stream comprising the free radical initiator. The emulsion may be formed using the organic stream and an oxidant stream, and wherein the oxidant stream comprises the free radical initiator and the organic stream comprises the polymerizable organic monomer and the protonic acid. It will be appreciated that the oxidant stream is aqueous.

It has been found that the exothermic reaction and associated temperature spike that occurs on forming the product stream when the oxidant stream is first introduced into the organic stream can be further substantially controlled according to embodiments and examples as described herein. For example, the continuous flow process may further comprise:
  i) introducing the oxidant stream into the organic stream in a fluid conduit or continuous flow reactor in proximate fluidic connection with the temperature controlled continuous flow reactor; or
  ii) introducing the oxidant stream into the organic stream directly within the temperature controlled continuous flow reactor.

For the above option i), the oxidant stream and/or the organic stream may be each independently cooled prior to introduction into the feed conduit or the continuous flow reactor as an optional step. The continuous flow reactor in option i) may comprise at least one static mixer, and may for example be a continuous flow tubular reactor comprising a static mixer element. The continuous flow reactor in option i) may also be temperature controlled, and for example comprise a heat exchanger.

For the above option ii), the oxidant stream and/or organic stream may be each independently cooled prior to introduction within the temperature controlled continuous flow reactor as an optional step.

In another example, the organic stream comprises or consists of the polymerizable organic monomer, optionally one or more organic solvents, optionally one or more protonic acids. In another example, the oxidant stream comprises or consists of the free radical initiator and optionally one or more solvents comprising or consisting of water.

In another example, the emulsion is formed from inline mixing of the oxidant stream with the organic stream in flow by direct mixing within the temperature controlled continuous flow reactor or by inline mixing proximate to the temperature controlled continuous flow reactor. In another example, the emulsion is introduced into the temperature controlled continuous flow reactor. In another example, the process further comprises obtaining the conducting polymer or salt thereof from the product stream under continuous flow conditions.

In another example, the continuous flow process comprises:
  a) providing an organic stream comprising an organic solvent, a polymerizable organic monomer and a protonic acid;
  b) providing an oxidant stream comprising an aqueous solvent and a free radical initiator;
  c) mixing the organic stream and oxidant stream to form an emulsion stream;
  d) providing the emulsion stream into a temperature controlled continuous flow reactor comprising at least one mixing element, at a temperature effective for synthesising the conducting polymer or salt thereof to provide a product stream in the temperature controlled continuous flow comprising the conducting polymer or salt thereof; and
  e) obtaining the conducting polymer or salt thereof from the product stream under continuous flow conditions, after the product stream has exited the temperature controlled continuous flow reactor.

In other examples, the mixing of the oxidant stream and organic stream in the above step c) to form the emulsion stream may be via inline mixing of the oxidant stream with the organic stream in flow by direct mixing within the temperature controlled continuous flow reactor or by inline mixing proximate to the temperature controlled continuous flow reactor. For example, the continuous flow process for step c) may further comprise:
  i) introducing the oxidant stream into the organic stream in a fluid conduit or continuous flow reactor and mixing the organic stream and oxidant stream to form an emulsion stream, wherein the fluid conduit or the continuous flow reactor is in proximate fluidic connection with a temperature controlled continuous flow reactor; or
  ii) introducing the oxidant stream into the organic stream directly within the temperature controlled continuous flow reactor and mixing the organic stream and oxidant stream to form an emulsion stream.

The temperature controlled continuous flow reactor can be a temperature controlled continuous flow tubular reactor.

The conducting polymer can be selected from the group consisting of a polyarylamine, polyarylthiol, polypyrrole, polycarbazole, polyindole, polyazepine, polythiophene, poly(3,4-ethylenedioxythiophene), poly(3,4-propylenedioxythiophene), or any salt thereof. The polymerizable organic monomer can be selected from the group consisting of an arylamine, arylthiol, pyrrole, carbazole, indole, azepine, thiophene, 3,4-ethylenedioxythiophene, 3,4-propylenedioxythiophene monomer, or any salt thereof. Each conducting polymer and polymerizable organic monomer can be unsubstituted or substituted.

In an example, the conducting polymer is polyaniline and the polymerizable organic monomer is an unsubstituted or substituted aniline. In another example, the conducting polymer is poly(3,4-ethylenedioxythiophene) and the polymerizable organic monomer is an unsubstituted or substituted 3,4-ethylenedioxythiophene. In another example, the conducting polymer is poly(3,4-propylenedioxythiophene) and the polymerizable organic monomer is an unsubstituted or substituted 3,4-propylenedioxythiophene monomer.

Each individual polymerised chain of the conducting polymer, or any salt thereof, can be independently comprised of individual monomer units of between about 100 to 1500, 300 to 1400, 500 to 1300, 600 to 1200, or 700 to 1100. The weight average molecular weight of the conducting polymer produced in the process may be between about 10,000 and 120,000, between about 20,000 and 110,000, or between about 60,000 and 100,000. In one example, each individual polymerised chain of the conducting polymer is independently comprised of individual monomer units of between about 100 to 1500. In another example, the conducting polymer has a weight average molecular weight of between 10,000 and 120,000.

The temperature of the mixed streams may be set between about −10 to 10° C., −5 to 5° C., or −1 to 1° C. and maintained across the axial flow length of the continuous flow tubular reactor. A temperature may be set within these ranges while providing a variation of less than about 3° C., for example less than about 2° C. or 1° C. In an example, for step c) the temperature of the mixed streams is set between about −5 to 5° C. and maintained across an axial flow length of the continuous flow reactor, allowing a variation of 1-2° C. or less.

In one example, there is provided a continuous flow process for controlled synthesis of polyaniline or salt thereof, comprising providing an emulsion of aniline, a protonic acid and a free radical initiator in a temperature controlled continuous flow reactor comprising at least one mixing element, at a temperature effective for synthesising the conducting polymer or salt thereof to provide a product stream comprising the conducting polymer or salt thereof. The aniline or a salt thereof may be introduced into the process within an organic stream or as a neat organic solution. The protonic acid may be selected from an organic soluble protonic acid for forming an organic soluble aniline salt within the organic stream or organic phase of the emulsion. The protonic acid may be introduced into the process within an organic stream or as a neat organic solution.

In another example, the continuous flow process is for controlled synthesis of polyaniline or salt thereof, comprising the steps of:
a) providing an organic stream comprising an organic solvent, unsubstituted or substituted aniline or salt thereof, and optionally a protonic acid;
b) providing an oxidant stream comprising an aqueous solvent and a free radical initiator;
c) mixing the organic stream and oxidant stream to form an emulsion stream;
d) providing the emulsion stream in a temperature controlled continuous flow reactor comprising at least one mixing element at a temperature effective for synthesising polyaniline or salt thereof to provide a product stream in the temperature controlled continuous flow reactor comprising polyaniline or salt thereof;
e) obtaining polyaniline or salt thereof from the product stream under continuous flow conditions, after the product stream has exited the temperature controlled continuous flow reactor.

The free radical initiator can be an oxidising agent, for example ammonium persulfate (APS).

In an example, for step b) the oxidant stream is an aqueous stream comprising an aqueous solvent, and the mixing together of an organic stream and aqueous stream in a continuous flow in step c) provides an emulsion stream.

In an example, for step (a) the organic stream is a non-aqueous organic solution comprising the organic solvent, polymerizable organic monomer and a protonic acid.

The mixing element in the temperature controlled continuous flow reactor of step (c) can be at least one of a static mixer and dynamic mixer.

The oxidant stream and aqueous stream can be premixed under continuous flow conditions before introducing into the temperature controlled continuous flow reactor of step (c).

In an example, the organic stream is provided by:
a1) providing a protonic acid stream comprising an organic solvent and a protonic acid;
a2) providing a monomer stream comprising a polymerizable organic monomer and optionally an organic solvent; and
a3) mixing together the protonic acid stream and monomer stream to form the organic stream for step (a).

For step a2) the polymerizable organic monomer may be provided as a neat organic liquid.

In an example, the monomer stream is an aniline stream comprising an unsubstituted or substituted aniline and optionally an organic solvent; and step a3) provides mixing together the protonic acid stream and aniline stream to form the organic stream in step (a).

The protonic acid stream and monomer stream can be premixed under continuous flow conditions before mixing with the oxidant stream. In at least some examples, the premixing can provide further improvements for an emulsion of the product stream formed by the mixing of the organic stream and oxidant stream.

For the above continuous flow process, the polymerizable organic monomer can be an unsubstituted aniline. The protonic acid can be dinonylnapthalenesulfonic acid (DNNSA). The organic solvent can be selected from the group consisting of aromatic hydrocarbon, aliphatic hydrocarbon, alcohols, glycols, ethers, glycol ethers, and mixtures thereof. In one example, the organic solvent can be selected from the group consisting of an alcohol, a glycol, a glycol ether, and any combination thereof. In at least some examples, the selection of the organic solvent can provide further improvements for an emulsion of the product stream formed by the mixing of the organic stream and oxidant stream. The free radical initiator can be an oxidising agent selected from the group consisting of persulfates, peroxides, dichromates, cerium (IV) salts, iron (III) salts, and any mixtures thereof. In one example, the oxidising agent is ammonium persulfate (APS).

The concentration of the aniline in the organic stream can be from about 0.1 M to about 0.8 M, for example from about 0.2 M to about 0.5 M.

For the continuous flow reactor, such as a tubular reactor, the internal diameter of a passage in the reactor can be provided with an internal diameter to facilitate mixing and back pressure properties. For example, the passage may range from being smaller to increase shear to larger to accommodate a static mixer element for industrial scale operation. For example, the internal diameter of the passage or chamber may be at least about 2 mm, 3 mm, 4 mm, or 5 mm. The internal diameter of the reactor can be between about 5 to 20 mm, for example between about 5 to 10 mm. For the continuous flow process or system, the minimum internal diameter of any portion of the continuous flow system may be greater than 1 mm, for example at least about 2 mm or at least about 3 mm. Different internal diameters will affect the fluid flow within the reactor. For reactors of the same internal volume, one configured with smaller diameter passages or tubing will result in a higher fluid flow velocity at a given residence time. As such smaller passages or tubing diameters will result in enhanced mixing performance due to more turbulent fluid flow and higher shear around static mixer elements, for example. However, the system pressure will also increase as the passage or tubing diameter is decreased which is a consideration when deciding upon appropriate materials of construction and reactor design. In an emulsion polymerisation process it is beneficial to keep the tubing diameter small as this maximises the shear forces on the fluid resulting in a finer emulsion.

In an example, the process provides at least about 50 g of conducting polymer per hour of operation. The operation performance can be provided with respect to a continuous flow reactor volume of about 100 to 3000 ml. In at least some examples, the operation performance can be at an industrial scale. In at least some examples, the process can provide at least about 100 g of conducting polymer per hour of operation per litre of internal volume of the continuous flow reactor.

In another example, following step d) or step e) an additive selected from the group consisting of a secondary dopant and additional reagent, is contacted with the conducting polymer or salt thereof.

In another aspect, there is provided a conducting polymer prepared by the continuous flow process according to any aspects or examples as described herein.

In another aspect, there is provided a composition, coating or material comprising the conducting polymer or salt thereof prepared by the continuous flow process according to any aspects or examples as described herein. The composition may be a liquid solution comprising the conducting polymer, such as a liquid concentrate.

In another aspect, there is provided a system for a continuous flow process for controlled synthesis of a conducting polymer or salt thereof, comprising:
  a) a temperature controlled continuous flow reactor comprising at least one mixing element for forming an emulsion according to any one or more embodiments or examples thereof as described herein;
  b) one or more pumps for providing fluidic flow for any one or more streams passing through the temperature controlled continuous flow reactor;
  c) one or more heat exchangers for controlling the temperature of the temperature controlled continuous flow reactor;
  d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and
  e) a control means for controlling one or more of the parameters of the system selected from concentration, flow rate, temperature, pressure, and residence time, of one or more streams, fluidic reactants, sources of fluidic reactants, fluids, or products of the reaction.

In one example, the system further includes a continuous flow mixer (e.g. Mixer 1) for forming the organic stream, wherein the continuous flow mixer optionally comprises at least one mixing element and is in fluidic connection with the temperature controlled continuous flow reactor.

In another example, the system further includes a continuous flow mixer (e.g. Mixer 2) for forming the product stream, wherein the continuous flow mixer optionally comprises at least one mixing element and is in fluidic connection with the temperature controlled continuous flow reactor.

In another example, the system further includes a first continuous flow mixer (e.g. Mixer 1) for forming the organic stream that is in fluidic connection with a second continuous flow mixer (e.g. Mixer 2) for forming the product stream, wherein the first and second continuous flow mixers each optionally comprise at least one mixing element, and wherein the second continuous flow mixer is in fluidic connection with the temperature controlled continuous flow reactor.

It will be appreciated that further aspects and examples are described herein, which may include one or more of the features as described above.

The features, functions, and advantages that have been discussed can be achieved independently in various examples or may be combined with yet other examples, and further details of which can be seen with reference to the following description and drawings.

BRIEF DESCRIPTION OF THE DRAWINGS

Examples of the present disclosure will now be further described and illustrated, by way of illustration only, with reference to the accompanying drawings in which.

DETAILED DESCRIPTION

Figure 1:
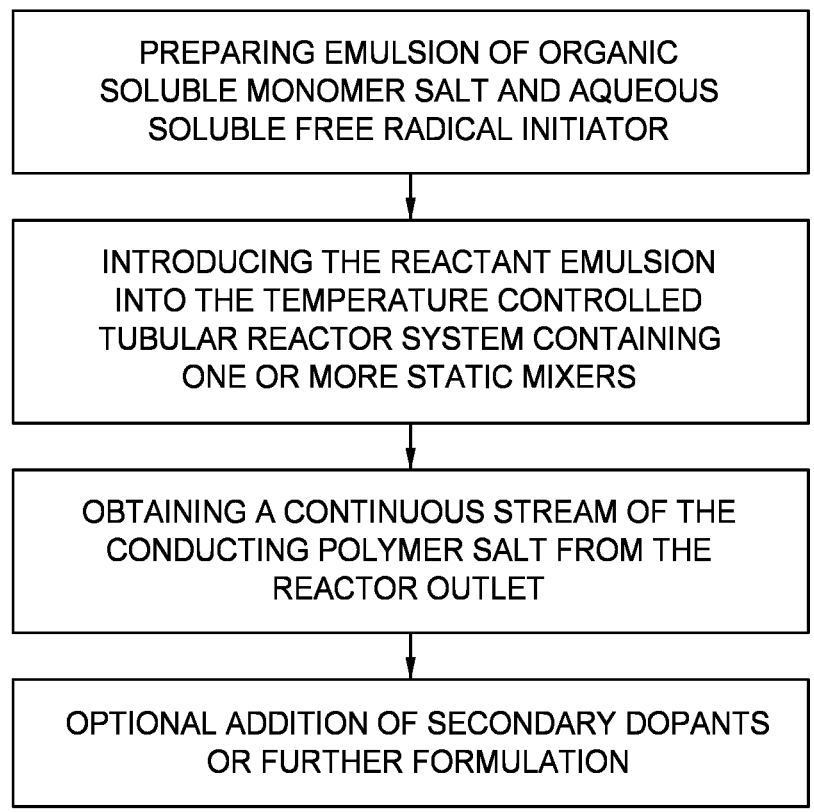
FIG. 1 is a schematic diagram showing an example continuous flow process and system according to one example of the present disclosure.

The present disclosure describes the following various non-limiting examples, which relate to investigations undertaken to identify alternative methods for preparing various conducting polymers, for example polyanilines. Various batch processes were investigated although poor temperature control was found to be problematic and impacted on the properties of conducting polymers prepared from the process including introduction of undesirable impurities. Although it was unknown if a continuous flow process could be effective for scaling up delicate and complex batch processes, various continuous flow processes were investigated. Various attempts to scale up batch processes under continuous flow conditions were unsuccessful. However, continued investigations around continuous flow processes eventually led to identifying a continuous flow process that was found to be surprisingly effective for controlled synthesis of various conducting polymers including polyanilines.

The continuous flow process comprises providing an emulsion of a polymerizable organic monomer, a protonic acid and a free radical initiator in a temperature controlled continuous flow reactor. The reactor can comprise at least one mixing element. The temperature can be controlled to be effective for synthesising the conducting polymer or salt thereof to provide a product stream comprising the conducting polymer or salt thereof. The continuous flow process can comprise a continuous flow reactor comprising one or more passages in fluidic communication for carrying the reactant and product streams, for example a continuous flow tubular reactor. The present continuous flow process according to at least some examples as described herein can provide for any one or more of precise variable control of reagent proportions to control final product molecular weights, solubility and thermal stability, addition of dopants after polymerization to enhance conductivity, use of increased concentrations of organic monomers, better scalability and industrial processing, and/or improved control over temperatures during processing, which can prevent or reduce undesirable fluctuations in temperature that can contribute to impurities or undesirable by-products into the product stream.

The continuous flow process may also comprise providing a continuous flow of an organic stream comprising a polymerizable organic monomer in an organic solvent. The organic stream can be mixed with an oxidant stream comprising a free radical initiator to form a product stream that initiates polymerization of the polymerizable organic monomer. For example, an oxidant stream comprising a free radical initiator can be mixed with an organic stream comprising an aniline monomer to initiate polymerisation of the aniline monomer to form a polyaniline. The polymerizable organic monomer can be converted in-situ during the continuous flow process into an organic solvent soluble salt prior to its polymerization with a free radical initiator into a conducting polymer. The conducting polymer formed in situ in the product stream can be an organic soluble conducting polymer salt, which provides a more readily utilised conducting polymer that can be conveniently applied in other processes or materials.

It will be appreciated that reference to "mixed" or "mixing" as described herein in relation to the continuous flow process generally refers to inline mixing that occurs during the continuous flow of fluid in the reactors, mixers or conduits of the system. The emulsion stream or product stream may be formed by mixing within a temperature controlled continuous flow reactor or by mixing proximate to the reactor. From the teaching of the present disclosure, it will be appreciated that such mixing to form an emulsion stream or product stream within or proximate to the temperature controlled continuous flow reactor can provide further advantages for controlling temperature fluctuations in the streams.

The continuous flow process can enable the synthesis of the conducting form of the polymer, for example the emeraldine form of polyaniline such as a polyaniline emeraldine salt.

At least according to some examples as described herein, a conducting polymer can be synthesised in the continuous flow process that is in its electrically conductive form (e.g. polyaniline emeraldine salt) and soluble in at least some organic solvents, which assists further processing of the conductive polymer for use in various compositions, formulations, coatings and materials.

At least according to some examples as described herein, the continuous flow process can allow in situ (i.e. in-stream) formation of an organic soluble polymerizable monomer salt that itself can be polymerized during the continuous flow process into an organic soluble electrically conducting polymer form that is more readily processable and allows scalability for industrial applications.

The present continuous flow process according to some examples can enable improved control of temperatures during processing to prevent undesirable fluctuations in temperature that may introduce or increase the presence of further impurities or undesirable by-products in the product stream and resulting material, and can allow for increased concentrations of the organic monomer to be used resulting in improved scalability and industrial preparations.

Specific Terms

The term "polymerizable organic monomer" as used herein refers to any one or more organic monomers or comonomers, which may be in the form of a protonated salt or are capable of forming a protonated salt in the presence of a protonic acid source, and is capable of polymerizing in the presence of a free radical initiator to form a conducting polymer. An example of a polymerizable organic monomer is aniline, which includes its protonated form, and which can be polymerized to provide a conducting polymer of polyaniline.

The term "conducting polymer" refers to any organic polymer or organic copolymer that is capable of conducting electricity, and may for example include a polymer that is a semi-conductor. It will be appreciated that a conducting polymer may require further processing to provide desired conductance properties. An example of a conducting polymer is polyaniline. It will be appreciated that the terms "conducting polymer" or "polymer" can include one or more "copolymers", and the term "monomer" can include one or more comonomers.

It will be appreciated that reference to "continuous flow" is understood in terms of continuous flow chemistry to mean a process in which a chemical reaction is carried out in a continuously flowing stream of reagents with the reaction reaching completion or near completion within the continuous reactor system and the product produced therein without the need for further chemical reaction after exiting the reactor system. For example, the term continuous flow denotes the continuous feeding of organic and oxidant streams into a temperature controlled reactor and polymerised monomer exiting from the outlet of the reactor in fluid flow. For example, a continuous flow reactor in its most basic form consists of a series of tubes or channels, one or more pumps and at least one mixing element.

"Element" refers to an individual unit that can be used together with one or more other components in forming a continuous flow reactor system. Examples of an element include an "insert" or "module" as described herein.

"Single pass reactor" refers to a reactor used in a process or system where the fluidic components pass through the reactor on a single occasion and are not recycled back through the reactor from which they have already passed through.

"Aspect ratio" means the ratio of length to diameter (L/d) of a single unit or element.

"Proximate" refers to being at, adjacent to, next to, near to or close to a point of reference.

"Organic stream' generally refers to a stream consisting essentially of one or more organic components in fluid flow, and without additional aqueous solvents such as water unless present as incidental impurities.

It will be appreciated that "incidental impurities" may refer to minor amounts of impurities, for example (in weight % based on total weight) less than about 5, 4, 3, 2, 1, 0.5, 0.1, 0.05, or 0.01.

It will be understood that the term "h" refers to the time unit of "hours".

As it will be understood, "aryl" whether used alone, or in compound words such as alkylaryl or arylalkyl, may refer to: (i) a substituted or unsubstituted mono- or polycyclic aromatic carbocyclic moiety, e.g., of about 6 to about 20 carbon atoms, such as phenyl, naphthyl or fluorenyl; or (ii) a substituted or unsubstituted partially saturated polycyclic carbocyclic aromatic ring system in which an aryl and a cycloalkyl or cycloalkenyl group are fused together to form a cyclic structure such as a tetrahydronaphthyl, indenyl, indanyl or fluorene ring. It will be appreciated that the polycyclic ring system may include a bicyclic and/or tricyclic ring system. It will also be appreciated that the term "unsubstituted" refers to the absence of one or more substituent groups or presence of one or more hydrogens. The "substituted" groups may be a $C_{1-20}$alkyl or $C_{1-10}$alkyl as defined herein.

"Alkyl" whether used alone, or in compound words such as alkylaryl or arylalkyl, represents straight or branched chain hydrocarbons ranging in size from one to about 20 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl and/or butyl, pentyl, hexyl, and higher isomers, including, e.g., those straight or branched chain hydrocarbons ranging in size from about 6 to about 20 carbon atoms, or greater. For example, "alkyl" may include a "$C_{1-20}$alkyl" or "$C_{1-10}$alkyl" as described below.

The term "$C_{1-20}$alkyl," as used herein refers to a straight chain or branched, saturated hydrocarbon having from 1 to 20 carbon atoms. Representative "$C_{1-20}$alkyl" groups include, but are not limited to, -methyl, -ethyl, -n-propyl, -n-butyl, -n-pentyl, -n-hexyl, -n-heptyl, -n-octyl, -n-nonyl, -n-decyl; n-undecyl, n-dodecyl, n-tridecyl, n-tetradecyl, n-pentadecyl, n-hexadecyl, n-heptadecyl, n-octadecyl, n-nonadecyl, n-icosyl.

The term "$C_{1-10}$alkyl," as used herein refers to a straight chain or branched, saturated hydrocarbon having from 1 to 10 carbon atoms. Representative "$C_{1-10}$alkyl" groups include, but are not limited to, -methyl, -ethyl, -n-propyl, -n-butyl, -n-pentyl, -n-hexyl, -n-heptyl, -n-octyl, -n-nonyl and -n-decyl; while branched $C_{1-8}$alkyls, for example, include, but are not limited to, -isopropyl, -sec-butyl, -isobutyl, -tert-butyl, -isopentyl, 2-methylbutyl, 1-hexyl, 2-hexyl, 3-hexyl, methyl, ethyl, propyl, isopropyl, n-butyl, isobutyl, sec-butyl, tert-butyl, n-pentyl, isopentyl, neopentyl, n-hexyl, isohexyl, 2-methylpentyl, 3-methylpentyl, 2,2-dimethylbutyl, 2,3-dimethylbutyl, 2,2-dimethylpentyl, 2,3-dimethylpentyl, 3,3-dimethylpentyl, 2,3,4-trimethylpentyl, 3-methylhexyl, 2,2-dimethylhexyl, 2,4-dimethylhexyl, 2,5-dimethylhexyl, 3,5-dimethylhexyl, 2,4-dimethylpentyl, 2-methylheptyl, 3-methylheptyl, n-heptyl, isoheptyl, n-octyl, and isooctyl.

The terms "alkylaryl", "$C_{1-20}$alkylaryl", or "$C_{1-10}$alkylaryl", refer to a compound having an alkyl group bonded to an aryl group wherein the "alkyl", "$C_{1-20}$alkyl", $C_{1-10}$alkyl", and "aryl" moieties, are each defined supra.

Unless defined otherwise, the term "substituted" generally refers to a group substituted at any available position. Substitution can be with one or more groups or moieties as described herein, for example selected from the group consisting of halo, nitro, hydroxyl, alkyl, haloalkyl, alkyloxy, aryl, arylalkyl, and alkylaryl.

The term "unsubstituted", for example when used in relation to "unsubstituted aniline", refers to the absence of one or more substituent groups or presence of one or more hydrogens.

"Hydroxyl" represents a —OH moiety.

"Alkyloxy" represents an —O-alkyl group in which the alkyl group is as defined supra. Examples include methoxy, ethoxy, n-propoxy, iso-propoxy, and the different butoxy, pentoxy, hexyloxy and higher isomers.

"Aryloxy" represents an —O-aryl group in which the aryl group is as defined supra. Examples include, without limitation, phenoxy and naphthoxy.

"Amino" represents an —NHR moiety where R represents hydrogen or alkyl as defined supra.

"Nitro" represents a —NO$_2$ moiety.

"Carboxyl" represents a —C(O)R moiety where R represents hydrogen or alkyl as defined supra.

The term "halo" or "halogen" whether employed alone or in compound words such as haloalkyl, represents fluorine, chlorine, bromine or iodine. Further, when used in compound words such as haloalkyl, the alkyl may be partially halogenated or fully substituted with halogen atoms which may be independently the same or different. Examples of haloalkyl include, without limitation, —CH$_2$CH$_2$F, —CF$_2$CF$_3$ and —CH$_2$CHFCl. Examples of haloalkoxy include, without limitation, —OCHF$_2$, —OCF$_3$, —OCH$_2$CCl$_3$, —OCH$_2$CF$_3$ and —OCH$_2$CH$_2$CF$_3$. Examples of haloalkylsulfonyl include, without limitation, —SO$_2$CF$_3$, —SO$_2$CCl$_3$, —SO$_2$CH$_2$CF$_3$ and —SO$_2$CF$_2$CF$_3$.

General Terms

Throughout this disclosure, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

Reference herein to "example", "one example", "another example" or similar language means that one or more feature, structure, element, component or characteristic described in connection with the example is included in at least one embodiment or implementation. Thus, the phrases "in one example", "as one example" and similar language throughout the present disclosure may, but do not necessarily, refer to the same example. Further, the subject matter characterizing any one example may, but does not necessarily, include the subject matter characterizing any other example.

Those skilled in the art will appreciate that the disclosure herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations or any two or more of said steps or features.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "consists of", or variations such as "consisting of", refers to the inclusion of any stated element, integer or step, or group of elements, integers or steps, that are recited in context with this term, and excludes any other element, integer or step, or group of elements, integers or steps, that are not recited in context with this term.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Continuous Flow Process

The continuous flow process of the present disclosure can be understood in terms of continuous flow chemistry to mean a process in which a chemical reaction is carried out in a continuously flowing stream of reagents with the reaction reaching completion within the continuous reactor system and the product being produced within the continuous fluidic stream without the need for further chemical reaction after exiting the reactor system. For example, the term "continuous flow" in the present disclosure can refer to a continuous flow process that has reached a steady state operation. The continuous flow process can comprise a continuous flow reactor comprising one or more passages in fluidic communication for carrying the reactant and product streams. For example, a continuous flow system may be a tubular reactor, which in its most basic form comprises a series of passages or channels of various configurations in fluidic communication.

It will be appreciated that the continuous flow process of the present disclosure is different to a batch, semi-batch, or semi-continuous process. For example, collecting the product into a tank in order to complete the chemical reaction after performing steps in a tubular reactor would make the overall process a semi-continuous process. It would also be appreciated that periodically stopping or interrupting the reactor to perform a wash cycle in order to recover your product is also semi-continuous. In other words the semi-continuous process interrupts the continuous flow operation before completion, preparation or collection of the conducting polymer. It will also be understood that a reaction is continuous if the conducting polymer is chemically synthesised within the length of the flow reactor and is obtainable from the exiting product stream during operation without the need for further chemical synthesis. For example, the synthesis of polyaniline as a doped, soluble polymer is produced within the continuous flow reactor and no further chemical synthesis reaction is required. However, after the product stream containing the synthesised conducting polymer is obtained from the reactor, the present continuous flow process may comprise additional isolation, purification and material formulation steps that are not continuous. For example, the process of the present disclosure is still considered a "continuous process" for synthesising the conducting polymer even where the product stream containing the synthesised conducting polymer is obtained during operation from the reactor, and then step wise separated into an aqueous and organic phase, and washed with acidified water.

It will also be appreciated that various configurations and designs of continuous flow reactors may be used to achieve a continuous flow process as herein described. The continuous flow process can comprise a continuous flow reactor comprising one or more passages in fluidic communication for carrying the reactant and product streams, for example a continuous flow tubular reactor. A continuous flow tubular reactor as described herein is not limited to design configurations requiring substantially tubular or cylindrical fluidic channels or sections. The term "continuous flow tubular reactor" in its broadest general meaning to include various advanced and plug flow reactor designs and configurations. For example, the continuous flow tubular reactor may be a plate reactor, such as an Advanced-Flow™ reactor from Corning Incorporated. The configuration of the plate reactor may provide one or more plates each comprising one or more fluidically connected passages or channels. The fluidically connected passages or channels can be of various configurations, for example flattened, elongate or elliptical. The continuous flow tubular reactor comprises one or more passages in fluidic communication for carrying the streams. The configuration of the passages enable the streams to flow within the passages throughout the duration of a desired residence time. The mixing element in the continuous flow tubular reactor of step (c) can be a static mixer or dynamic mixer. The static mixer has a static or fixed structural element located within a conduit or chamber that can mix fluids under flow, and is further described in various embodiments and examples herein. In one example, the static mixing element in the continuous flow reactor can be provided by one or more passages of the reactor comprising at least a section thereof configured for enhancing mixing of the streams (e.g. enhancing radial mixing or chaotic advection). It will be appreciated that a dynamic mixer has a moving element that can mix fluids, such as a paddle, spinning tube, rotor, blender, or rotating disc.

The present disclosure provides a continuous flow process for controlled synthesis of a conducting polymer, for example polyaniline. The conducting polymer, can be a salt or copolymer. It will be appreciated that the conducting polymer prepared in the continuous flow process can be further processed or used in a polymer blend or composite material.

An example of the continuous flow process is described in the schematic diagram in FIG. 1a. A reactant emulsion (i.e. product stream) can be prepared comprising an organic soluble monomer salt and an aqueous soluble free radical initiator. The reactant emulsion can be formed within or introduced into a temperature controlled tubular reactor system containing one or more mixing elements, for example one or more static mixers or passages configured to enhance mixing. The continuous stream of the reactant emulsion flowing through the continuous flow reactor synthesises the conducting polymer within the emulsion stream flowing through the reactor to form a product stream exiting the reactor containing the conducting polymer synthesised therein without any need for stopping or interrupting the continuous operational flow of the emulsion stream (and product stream) through the reactor. The conducting polymer formed within the fluid flowing through the reactor may be in the form of a conducting polymer salt without the need to stop, interrupt or further process the product stream.

The polymerizable organic monomer may be an organic soluble monomer salt or precursor mixture of organic monomer and protonic acid. The polymerizable organic monomer salt can be introduced into the process within an organic stream or as a neat organic solution. The neat organic solution may be a concentrate or comprise one or more organic solvents. It will be appreciated that the product stream comprises a polymerizable organic monomer and free radical initiator such that conducting polymer can form in flow (i.e. inline mixing).

Figure 2:
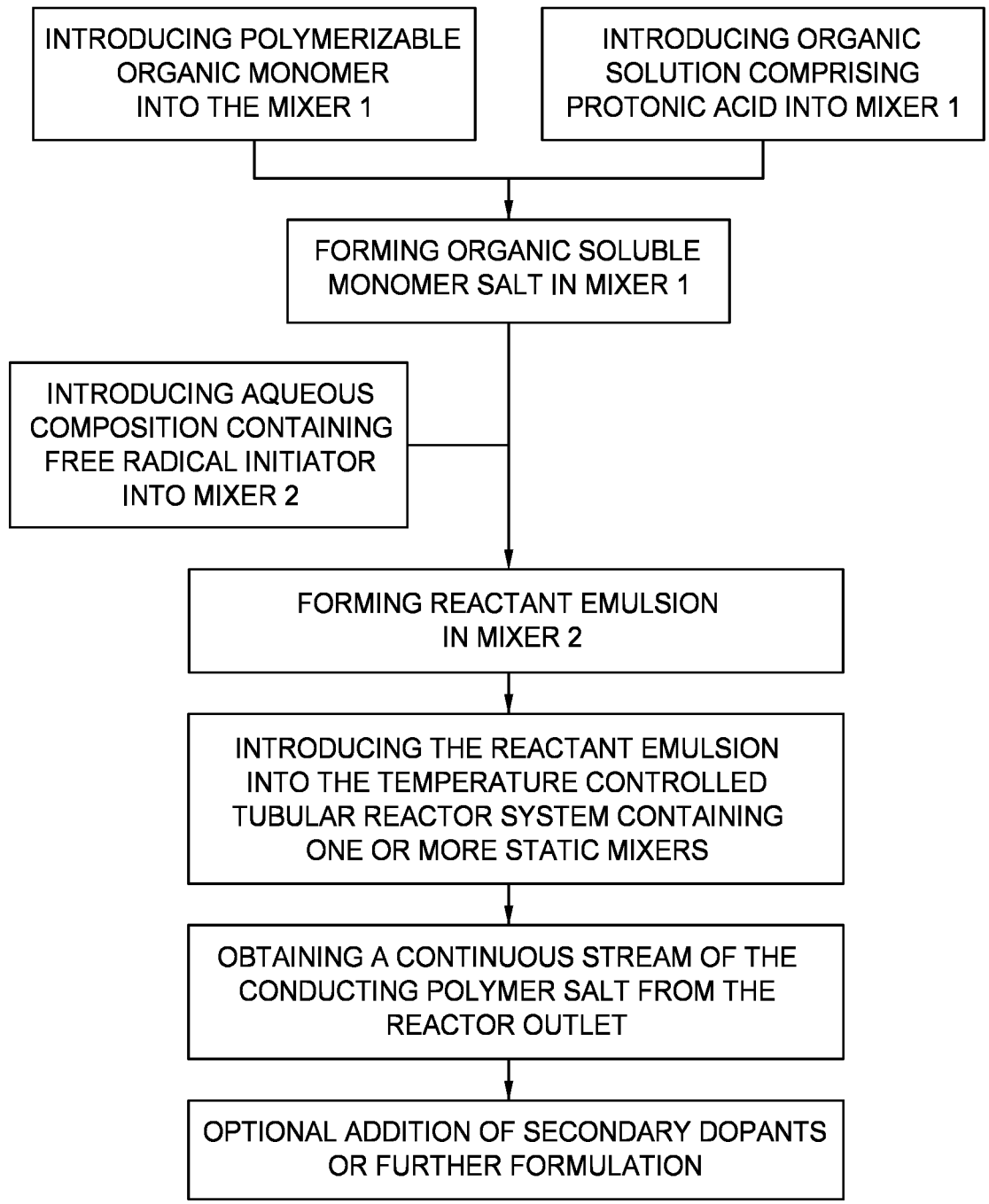
FIG. 2 is a schematic diagram showing a continuous flow process and system according to one example of the present disclosure.

FIGS. 1 and 2 provide general examples of the flow process and reaction conditions. Various configurations may achieve a product stream in a temperature controlled continuous flow reactor that can be provided in the form of an emulsion comprising an organic soluble polymerizable organic monomer and an aqueous soluble free radical initiator. Input of the organic stream comprising the organic soluble polymerizable organic monomer, or input of the oxidant stream comprising the free radical initiator, may each be varied, for example these streams may be pre-mixed to form an emulsion stream or mixed together within the reactor to form an emulsion stream. In another example, the oxidant stream is introduced directly into the temperature controlled continuous flow reactor, or mixed with an organic stream proximate to the temperature controlled continuous flow reactor. The temperature may be established and controlled for any individual or mixed streams before introduction into the temperature controlled continuous flow reactor, according to any temperature examples or embodiments as described herein. In this way the process conditions may be further improved to reduce or prevent any problematic temperature change (i.e. spike or exotherm) occurring in the product stream. The emulsion stream comprises a biphasic mixture of an organic and aqueous phase, wherein the organic phase comprises the polymerizable organic monomer and optional protonic acid, and the aqueous phase comprises the free radical initiator. The emulsion stream may be formed into an emulsion before or after entry into the temperature controlled continuous flow reactor. It will be appreciated that a product stream is established when the polymerizable organic monomer (e.g. monomer salt or combination of monomer and protonic acid) in an organic phase is mixed with a free radical initiator in an aqueous phase. Without wishing to be bound by any theory, it has been unexpectedly found that the highly exothermic polymerization reaction can be driven under effectively mixed emulsion flow conditions by providing a high concentration of polymerizable organic monomer in the organic phase that reacts with the aqueous soluble free radical initiator at the interface between the aqueous phase and organic phase, to generate conducting polymer in situ in the organic phase. The polymerization reaction is difficult to initiate under flow conditions and once initiated can result in problematic exothermic temperature spikes. Process flow conditions may also be further controlled to enable the product stream to form a segmented biphasic flow that can further facilitate efficient processing of the prepared conducting polymer.

It will be appreciated that the emulsion stream, or product stream, is biphasic. The biphasic nature arises from the mixing of an organic stream and an aqueous stream, which together form an emulsion stream. The introduction of the oxidant stream, or free radical initiator, into an organic stream or emulsion stream comprising a polymerizable organic monomer (e.g. aniline and protonic acid, or aniline salt), provides a product stream from which a conducting polymer can form in flow. As mentioned above, as the organic soluble conducting polymer forms in the product stream the process conditions may be further controlled so that the emulsion of the product stream begins to form an axial segmented biphasic flow. The axial segmented biphasic flow can provide a series of aqueous axial segments separated by organic axial segments. The aqueous axial segments comprise unreacted free radical initiator and/or solvent and the organic axial segments comprise the organic soluble conducting polymer.

In another example, the continuous flow process for controlled synthesis of a conducting polymer or any salt thereof, can comprise the steps of:
a) providing an organic stream comprising an organic solvent, a polymerizable organic monomer and optionally a protonic acid;
b) providing an oxidant stream comprising an aqueous solvent and a free radical initiator; and
c) mixing the organic stream and the oxidant stream in a temperature controlled continuous flow reactor comprising at least one mixing element, at a temperature effective for synthesising the conducting polymer or salt thereof to provide a product stream in the tubular reactor comprising the conducting polymer or salt thereof; and
d) obtaining the conducting polymer or salt thereof from the product stream under continuous flow conditions, after the product stream has exited the reactor.

For step (a) the organic stream may be a non-aqueous organic solution comprising the organic solvent, polymerizable organic monomer (e.g. as a polymerizable organic monomer salt or precursor mixture of organic monomer and protonic acid). For step b) the oxidant stream may be an aqueous stream comprising an aqueous solvent and the free radical initiator, for example an oxidising agent such as ammonium persulfate. For step c) the mixing together of an organic stream and aqueous stream in a continuous flow can provide a product stream in the form of an emulsion.

It will be appreciated that the reagents in the organic stream and oxidant stream combine in fluid flow and react to form a product stream containing the conducting polymer or conducting polymer salt. As previously mentioned, the continuous flow process does not require any chemical synthetic reaction steps in order to recover the conducting polymer or conducting polymer salt from the tubular reactor.

The continuous flow process, system or reactor of the present disclosure can be operated at a predetermined pressure and temperature. For example, the temperature of any individual or mixed stream, such as the organic stream, oxidant stream, emulsion stream, or product stream, in the overall process, or in the tubular reactor, may be set between about $-15$ to $15°$ C., $-10$ to $10°$ C., $-5$ to $5°$ C., or $-1$ to $1°$ C. The temperature of any individual or mixed streams in the overall process, or in the reactor, may be less than about 10° C., 9° C., 8° C., 7° C., 6° C., 5° C., 4° C., 3° C., 2° C., or 1° C. The temperature of any individual or mixed streams in the overall process, or in the reactor, may be greater than about −10° C., −9° C., −8° C., −7° C., −6° C., −5° C., −4° C., −3° C., −2° C., or −1° C. The temperature may be provided at any range between these upper and lower values. These temperatures may be maintained across the axial flow length of the continuous flow reactor. Further, a temperature may be set within these ranges while providing a variation of less than about 5° C., 4° C., 3° C., 2° C., or 1° C. Improved control of the temperature including variation across the axial flow length has been shown to surprisingly provide conducting polymers from the product stream that have high electro-conductivities and/or a reduced solids content, for example reduced amounts of low molecular weight products.

In an example, the continuous flow process is for controlled synthesis of polyaniline or any salt thereof, comprising the steps of:
- a) providing an organic stream comprising an organic solvent, an unsubstituted or substituted aniline or salt thereof and optionally a protonic acid;
- b) providing an oxidant stream comprising an aqueous solvent and a free radical initiator; and
- c) mixing the organic stream and oxidant stream in a continuous flow reactor comprising at least one mixing element at a temperature effective for synthesising polyaniline or salt thereof to provide a product stream in the reactor comprising polyaniline or salt thereof; and
- d) obtaining polyaniline or salt thereof from the product stream under continuous flow conditions, after the product stream has exited the reactor.

In any of the above examples, the free radical initiator may be an oxidising agent. The free radical initiator may be an aqueous or water soluble oxidising agent. The free radical initiator or oxidising agent may be ammonium persulfate. The oxidant stream may be an aqueous stream comprising an aqueous solvent. The free radical initiator or oxidising agent may be soluble in the aqueous solvent. The mixing together of an organic stream and aqueous stream in a continuous flow can provide a product stream in the form of an emulsion. In any of the above examples, for step (a) the organic stream may be a non-aqueous organic solution comprising the organic solvent, polymerizable organic monomer and optionally a protonic acid. The polymerizable organic monomer may be an organic soluble polymerizable organic monomer salt according to any one or more examples as described herein.

The mixing element in the continuous flow reactor of step (c) may be a static mixer or dynamic mixer (e.g. spinning tube). The static mixing element may be provided by one or more passages in the reactor in fluidic connection with each other for carrying the streams and configured for enhancing mixing thereof (e.g. radial mixing). The oxidant stream and aqueous stream may be premixed under continuous flow conditions before introducing into the continuous flow tubular reactor of step (c).

In an example, the organic stream is provided by:
- a1) providing a protonic acid stream comprising an organic solvent and a protonic acid;
- a2) providing a monomer stream comprising a polymerizable organic monomer and optionally an organic solvent; and
- a3) mixing together the protonic acid stream and monomer stream to form the organic stream for step (a).

The polymerizable organic monomer may be provided as a neat organic liquid optionally with one or more organic solvents. The polymerizable organic monomer may be an organic monomer salt or a precursor mixture of an organic monomer (e.g. aniline) and a protonic acid (e.g. DNNSA). The organic stream comprising the polymerizable organic monomer may be in the form of an organic liquid concentrate. For example, the organic stream may contain the polymerizable organic monomer in a concentration (in weight % of total organic stream) of at least 30, 40, 50, 60, 70, 80, 85, 90, 95, 98, or 99. The organic stream may contain the organic monomer and protonic acid for forming the polymerizable organic monomer in a concentration (in weight % of combined weight of organic monomer and protonic acid in total organic stream) of at least 30, 40, 50, 60, 70, 80, 85, 90, 95, 98, or 99. The monomer stream may contain the polymerizable organic monomer in a concentration (in weight % of total monomer stream) of at least 70, 80, 85, 90, 95, 98, or 99. The protonic acid stream may contain the protonic acid in a concentration (in weight % of total protonic acid stream) of at least 30, 40, 50, 60, 70, 80, 85, 90, 95, 98, or 99. It will be appreciated that one or more organic solvents as described herein can provide any remaining volume or weight % of the organic stream, other than any impurities that may be present.

In an example, the monomer stream is an aniline stream comprising an unsubstituted or substituted aniline and optionally an organic solvent; and step a3) provides mixing together the protonic acid stream and aniline stream to form the organic stream in step (a).

The protonic acid stream and monomer stream can be premixed under continuous flow conditions before mixing with the oxidant stream. In at least some examples, the premixing can provide further improvements for an emulsion of the product stream formed by the mixing of the organic stream and oxidant stream. The mixing of the streams in any one or more of the above examples may be provided by one or more static mixers under continuous flow conditions. Pre-mixing may include sonication, dynamic or static mixing options. The pre-mixing options can operate within a continuous flow process or system. In one example, the premixing is a continuous flow static mixer, for example as an in-line module that is in fluidic communication with the continuous flow reactor, such as a continuous flow tubular reactor.

An example of the continuous flow process is described in the schematic diagram in FIG. 2. The continuous flow process may include at least a first and second continuous flow mixer (i.e. Mixer 1 and Mixer 2) in addition to the tubular reactor, for example. The continuous flow mixer may be a fluid conduit or continuous flow reactor, such as a continuous flow reactor comprising a mixing element. Mixer 1, Mixer 2 and the tubular reactor can be provided in fluidic communication as an in series configuration, respectively. The mixing element in each of Mixer 1, Mixer 2, and the tubular reactor, can be an example as previously described for the mixing element, for example one or more continuous flow static or dynamic mixers. A first continuous flow mixer (Mixer 1) can be provided where a polymerizable organic monomer is separately introduced into the mixer (Mixer 1) as a neat liquid or in an organic solution, and a protonic acid is separately introduced into the same continuous flow mixer (Mixer 1) as an organic solution, thereby forming an organic soluble monomer salt in the mixer (Mixer 1). A second continuous flow mixer (Mixer 2) can then be provided in series with the first mixer (Mixer 1). A further aqueous stream containing a free radical initiator can then be introduced into Mixer 2 thereby forming a reactant emulsion in Mixer 2 between the organic soluble monomer salt stream and the aqueous stream containing the free radical initiator. The reactant emulsion stream (i.e. product stream) can then be introduced into the temperature controlled continuous flow reactor, such as a continuous flow tubular reactor, which may contain one or more static mixers housed therein (e.g. 5 or more static mixers) or comprise one or more passages configured for enhancing mixing of the streams. The conducting polymer or conducting polymer salt is then formed within the fluid that is flowing through the reactor during the continuous flow process, and the synthesised conducting polymer or conducting polymer salt can be collected from the stream exiting the reactor without the need for any stoppage, interruption or washing steps during the operation of the continuous flow process. In other words a conducting polymer salt can be synthesised within the reactor and obtained from the continuous stream exiting the reactor during normal operation of the continuous flow process.

Figure 3:
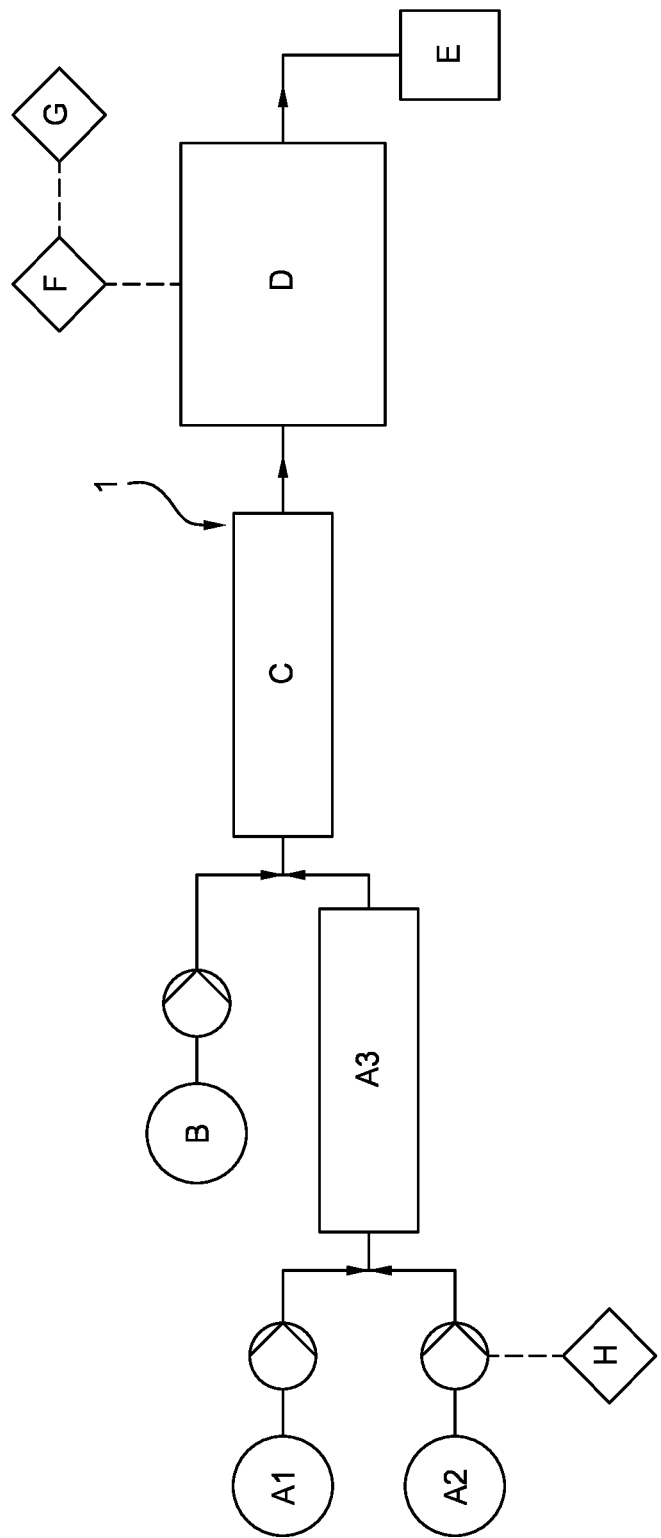
FIG. 3 is a schematic diagram showing a continuous flow process and system according to one example of the present disclosure.

FIG. 3 provides a schematic example showing mixing of any one or more of the streams as described herein including mixing of the oxidant stream and organic streams proximate to the temperature controlled continuous flow reactor. For example, a continuous flow mixer comprising a static mixer element (C) can be a fluidly connected to an inlet of the temperature controlled continuous flow reactor (D) to enable mixing of the oxidant stream and organic stream as described herein proximate to the temperature controlled continuous flow reactor (D). In one example, a continuous flow mixer comprising a static mixer element is a feed conduit to the temperature controlled continuous flow reactor (D). Additional feed conduits or continuous flow mixers or tubular reactors (with or without static mixers) may be provided in parallel or series (e.g. polymerizable organic monomer salt, A3) for optionally inline mixing any of the streams as described herein while fluidly connecting to the temperature controlled continuous flow reactor (D).

In another example, the continuous flow process may comprise the steps of:
 a) providing a protonic acid stream comprising an organic solvent and a protonic acid; providing a monomer stream comprising aniline; and mixing together the protonic acid stream and monomer stream in a continuous flow static or dynamic mixer to form an organic stream comprising a protonated aniline monomer;
 b) providing an oxidising agent in an aqueous stream comprising an aqueous solvent; and optionally premixing together the aqueous stream and organic stream to form a reactant emulsion stream;
 c) mixing together the aqueous stream and organic stream to form a reactant emulsion stream, or introducing the reactant emulsion stream, in a temperature controlled continuous flow tubular reactor comprising at least one static mixer, at a temperature effective for synthesising a polyaniline salt to provide a product stream in the tubular reactor comprising the conducting polymer of the polyaniline salt; and
 d) obtaining the conducting polymer of the polyaniline salt from the product stream under continuous flow conditions, after the product stream has exited the tubular reactor.

The continuous flow process for controlled synthesis of a conducting polymer or salt thereof, may comprise:
 a) providing an optionally cooled organic stream comprising an organic solvent, a polymerizable organic monomer and optionally a protonic acid;
 b) providing an optionally cooled oxidant stream comprising an aqueous solvent and a free radical initiator;
 c) introducing the organic stream and the oxidant stream directly into a temperature controlled continuous flow reactor comprising at least one static mixer element such that the organic stream and oxidant stream mix together to form an emulsion stream, and operating the temperature controlled continuous flow reactor at a temperature effective for synthesising the conducting polymer or salt thereof to provide a product stream in flow within the reactor comprising the conducting polymer or salt thereof; and
 d) obtaining the conducting polymer or salt thereof from the product stream after the product stream has exited the temperature controlled continuous flow reactor under continuous flow conditions.

The continuous flow process for controlled synthesis of a conducting polymer or salt thereof, may comprise:
 a) providing an optionally cooled organic stream comprising an organic solvent, a polymerizable organic monomer and optionally a protonic acid;
 b) providing an optionally cooled oxidant stream comprising an aqueous solvent and a free radical initiator;
 c) introducing the organic stream and the oxidant stream into a continuous flow mixer comprising at least one static mixer element such that the organic stream and oxidant stream mix together to form an emulsion stream;
 d) introducing the emulsion stream into a temperature controlled continuous flow reactor in fluidic communication with the continuous flow mixer of step c), wherein the temperature controlled continuous flow reactor comprises at least one static mixer and is operated at a temperature effective for synthesising the conducting polymer or salt thereof to provide a product stream in flow within the reactor comprising the conducting polymer or salt thereof; and
 e) obtaining the conducting polymer or salt thereof from the product stream after the product stream has exited the temperature controlled continuous flow reactor under continuous flow conditions.

The continuous flow process for controlled synthesis of a conducting polymer or salt thereof, may comprise:
 a1) providing a protonic acid stream comprising an organic solvent and a protonic acid;
 a2) providing a monomer stream comprising a polymerizable organic monomer and optionally an organic solvent; and
 a3) introducing the protonic acid stream and the monomer stream into a continuous flow mixer comprising at least one static mixer element such that the protonic acid stream and monomer stream mix together to form an organic stream;
 b) providing an optionally cooled oxidant stream comprising an aqueous solvent and a free radical initiator;
 c) introducing the organic stream and the oxidant stream into a continuous flow mixer comprising at least one static mixer element such that the organic stream and oxidant stream mix together to form an emulsion stream;
 d) introducing the emulsion stream into a temperature controlled continuous flow reactor in fluidic communication with the continuous flow mixer of step c), wherein the temperature controlled continuous flow reactor comprises at least one static mixer and is operated at a temperature effective for synthesising the conducting polymer or salt thereof to provide a product stream in flow within the reactor comprising the conducting polymer or salt thereof; and e) obtaining the conducting polymer or salt thereof from the product stream after the product stream has exited the temperature controlled continuous flow reactor under continuous flow conditions.

Further process steps may include further processing of the conducting polymer of the polyaniline salt according to any embodiments or examples as described herein.

Conducting Polymer

A conducting polymer prepared by the continuous flow process may be selected from any conducting polymer being a reaction product of a protonated polymerizable organic monomer or salt thereof, and a free radical initiator. Problems such as reaction control and poor solubilities leading to intractable products are well known for many conducting polymers, and batch processing solutions are commonly utilised and have become increasingly complex in recent years in seeking to obtain conducting polymers with appropriate properties.

Each individual polymerised chain of the conducting polymer, or any salt thereof, may be independently comprised of individual monomer units of between about 100 to 1500. The number of individual monomer units may be at least about 100, 200, 300, 400, 500, 600, 700, 800, 900, 1000, 1100, or 1200. The number of individual monomer units may be less than about 1500, 1400, 1300, 1200, 1100, 1000, 900, 800, 700, 600, or 500. The number of individual monomer units may be between about 300 to 1400, 500 to 1300, 600 to 1200, or 700 to 1100. The number of individual monomer units in an individual polymerised chain may be in a range provided by any lower and upper limit as previously described. It will be appreciated that lower molecular weight products may provide an undesirable level of toxicity and higher molecular weight products may be less processable. In other words, balancing properties of reduced toxicity with effective processability is desirable.

The conducting polymer or salt thereof produced in the process may have a number average molecular weight of at least 10,000. For example, number average molecular weight may be at least about 20,000, 30,000, 40,000, 50,000, 60,000, 70,000, or 80,000. The number average molecular weight may be in a range of about 10,000 to 120,000, 20,000 to 115,000, 30,000 to 110,000, 40,000 to 105,000, 50,000 to 100,000, or 60,000 to 100,000. The number average molecular weight may be less than about 120,000, 110,000, 100,000, 90,000, 80,000, 70,000, 60,000, 50,000, or 40,000. The number average molecular weight may be in a range provided by any lower and upper limit as previously described. It will be appreciated that lower molecular weight products may provide an undesirable level of toxicity and higher molecular weight products may be less processable. Again, it may be desirable to balance properties of reduced toxicity with effective processability.

The conducting polymer may be a copolymer. The conducting polymer may be selected from the group consisting of a polyarylamine, polyarylthiol, polypyrrole, polycarbazole, polyindole, polyazepine, polythiophene, and poly(3,4-ethylenedioxythiophene). In at least some examples, the polymers or copolymers can be selected to provide for further improved processability. In at least some examples, polyaniline polymers can provide improved conductivity over aniline copolymers. It will be appreciated that the conducting polymers include any salts thereof, which can be formed by reaction with a protonic acid. The conducting polymer can be a reaction product of an unsubstituted or substituted monocyclic, bicyclic, or tricyclic hetaryl monomer comprising at least one annular heteroatom selected from N and S. The conducting polymer can be a reaction product of an unsubstituted or substituted monocyclic, bicyclic, or tricyclic aryl monomer comprising at least one exocyclic heteroatom selected from N and S. It will be appreciated that the reaction products can involve reaction with a protonic acid and free radical initiator.

Polypyrrole and polyazepine are examples of conducting polymers prepared from a reaction product of a monocyclic hetaryl comprising at least one heteroatom selected from N. Polyindole is an example of a conducting polymer prepared from a reaction product of a bicyclic hetaryl comprising at least one heteroatom selected from N. Polycarbazole is an example of a conducting polymer prepared from a reaction product of a tricyclic hetaryl comprising at least one heteroatom selected from N. A polyarylamine, such as polyaniline, is an example of a conducting polymer prepared from a reaction product of a monocyclic aryl monomer comprising at least one exocyclic heteroatom selected from N. Polythiophene is an example of a conducting polymer prepared from a reaction product of a monocyclic hetaryl comprising at least one heteroatom selected from S. Poly(3,4-ethylenedioxythiophene) is an example of a conducting polymer prepared from a reaction product of a bicyclic hetaryl comprising at least one heteroatom selected from S. Polyphenylene sulfide is an example of a conducting polymer prepared from a reaction product of a monocyclic aryl monomer comprising at least one exocyclic heteroatom selected from S.

In one example, the conducting polymer is a polyarylamine, for example polyaniline. In another example, the conducting polymer is a polyarylthiol, for example polyphenylene sulfide. In another example, the conducting polymer is selected from the group consisting of polyaniline and poly(3,4-ethylenedioxythiophene).

The conducting polymer may be a base or salt, for example a polyaniline emeraldine salt. The polyaniline base or salt may be further processed into a polyaniline emeraldine base or salt. The polyaniline salt can be a sulfonate, for example where the acid was dinonylnapthalenesulfonic acid (DNNSA). The conducting polymer may be polyanilinedinonylnapthalenesulfonate (PANI-DNNSA).

Polyaniline

An aniline monomer can be used in the present continuous flow process and polymerised to form polyaniline. Polyaniline can be in three potential oxidation states: leucoemeraldine (white), emeraldine (green), and pernigraniline (blue/violet). The repeat unit of Formula 1a below provides x as half a degree of polymerization.

Formula 1a

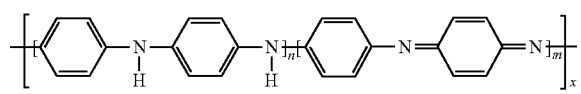

Leucoemeraldine is a fully reduced state (e.g. n=1, m=0). Pernigraniline is a fully oxidized state with imine links instead of amine links (n=0, m=1). The polyaniline can be in one of these three states or a mixture thereof. The emeraldine form of polyaniline (n=m=0.5), is referred to as emeraldine base (EB), if neutral, although when protonated (e.g. doped) is called emeraldine salt (ES), with the imine nitrogens protonated by an acid. Protonation facilitates delocalising the otherwise trapped diiminoquinone-diaminobenzene state. Emeraldine base is the preferred form of polyaniline because of its typical high stability at room temperature and on protonation to provide the emeraldine salt form, has high electrical conductivity. Leucoemeraldine and pernigraniline are poorer conductors, even when doped with an acid.

Polyphenylene Sulfide

The present continuous flow process may be used to form polyphenylene sulfide. Polyphenylene sulfide is an organic polymer comprising of aromatic rings linked with sulphide moieties. The repeat unit of Formula 2a below provides one example of a repeating unit of polyphenylene sulfide.

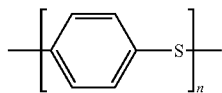

Formula 2a

Polyphenylene sulfide can be converted to the semiconducting from by oxidation or use of various dopants. Polyphenylene sulfide also offers high temperature resistance, chemical resistance, flowability, dimensional stability and electrical characteristics.

Polypyrrole

A pyrrole monomer can be used in the present continuous flow process and polymerised to form polypyrrole. Polypyrrole is a conducting organic polymer. The repeat unit of Formula 3a below provides one example of a repeating unit of polypyrrole.

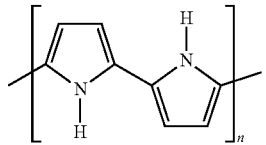

Formula 3a

Polypyrrole in its oxidized form is a good electrical conductor. Higher conductivities can be achieved by doping polypyrrole with large anions, such as tosylate.

Polycarbazole

A carbazole monomer can be used in the present continuous flow process and polymerised to form polycarbazole. Polycarbazole is an electrically conducting polymer in its doped state. The repeat unit of Formula 4a below provides one example of a repeating unit of polycarbazole.

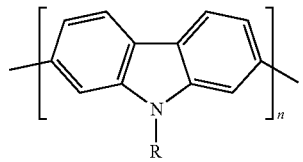

Formula 4a

When doped, the nitrogen of the polycarbazoles is oxidised prior to the backbone, which can create a high localised charge and good electrical conducting properties.

Polyindole

An indole monomer can be used in the present continuous flow process and polymerised to form polyindole. Polyindole is a conductive polymer containing a benzene ring linked with a pyrrolitic ring. The repeat unit of Formula 5a below provides one example of a repeating unit of polyindole.

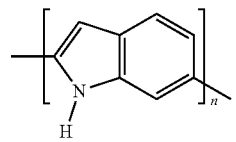

Formula 5a

Polyazepine

An azepine monomer can be used in the present continuous flow process and polymerised to form polyazepine. The repeat unit of Formula 6a below provides one example of a repeating unit of polyazepine.

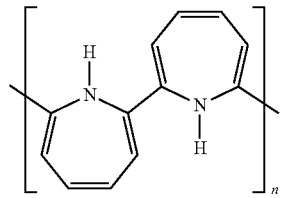

Formula 6a

Polythiophene

A thiophene monomer can be used in the present continuous flow process and polymerised to form polythiophene. Polythiophene becomes conducting when oxidised (doped). The repeat unit of Formula 7a below provides one example of a repeating unit of polythiophene.

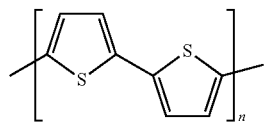

Formula 7a

The electrical conductivity of polythiophene results from the delocalisation of electrons along the polythiophene backbone. Polythiophene also has good optical properties which respond to various environmental stimuli, and include colour shifts in response to changes in solvent, temperature and applied potential. Both colour changes and conductivity changes are induced by the twisting of the polymer backbone, disrupting conjugation.

Poly(3,4-ethylenedioxy)thiophene

A 3,4-ethylenedioxythiophene monomer can be used in the present continuous flow process and polymerised to form poly(3,4-ethylenedioxythiophene). Poly(3,4-ethylenedioxythiophene) is a transparent conducting polymer, which can be employed in liquid crystal displays (LCDs) and solar cells. The repeat unit of Formula 8a below provides one example of a repeating unit of poly(3,4-ethylenedioxythiophene).

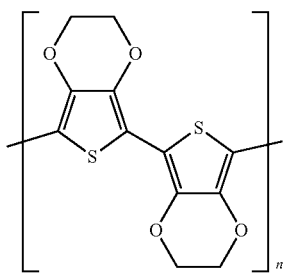

Formula 8a

Poly(3,4-ethylenedioxythiophene) has good optical transparent properties in its conducting state, high stability and a moderate band gap and low redox potential.

Poly(3,4-propylenedioxy)thiophene

A 3,4-propylenedioxythiophene monomer can be used in the present continuous flow process and polymerised to form poly(3,4-propylenedioxythiophene). Poly(3,4-propylenedioxythiophene) is a transparent conducting polymer with applications in electrochromic devices. The repeat unit of Formula 9a below provides one example of a repeating unit of poly(3,4-propylenedioxythiophene).

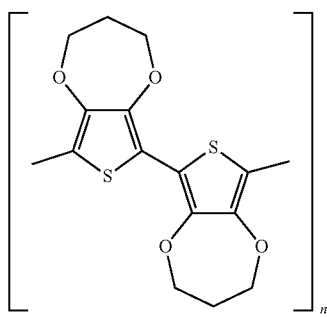

Formula 9a

Poly(3,4-propylenedioxythiophene) has excellent optical and electrochromic properties as well as good processability and solubility.

The conducting polymers and polymerizable organic monomers are described in further detail below in relation to the steps in the continuous flow process.

(A) Organic Stream

The organic stream can comprise a polymerizable organic monomer, for example an unsubstituted or substituted aniline or salt thereof. The organic stream can further comprise a protonic acid. The polymerizable organic monomer and/or protonic acid may be introduced into the organic stream neat or as an organic solution in an organic solvent. It will be appreciated that the protonic acid can provide a reagent for converting an organic monomer, such as aniline, into a polymerizable monomer salt, such as an anilinium ion. The monomer salt can then be polymerized to form the conducting polymer or precursor thereof, for example where an oxidant is used to initiate polymerization of aniline or its monomer salt to form polyaniline. In one example, the polymerizable organic monomer is a polymerizable organic monomer salt. The polymerizable organic monomer salt can be selected to be soluble in an organic solvent. The polymerizable organic monomer may be a polymerizable organic monomer salt, which may be soluble in organic solvents. As described below, an organic soluble polymerizable organic monomer salt may be prepared as a reaction product in situ in the organic stream by reaction with a proton acid (i.e. $H^+M^-$) having a counter ion (i.e. $M^-$) that provides charge neutrality to the polymer and can also enhance solubility of the conducting polymer in organic solvents to aid further processing thereof.

In one example, the organic stream of step a) is provided by:
a1) providing a protonic acid stream comprising an organic solvent and a protonic acid; a2) providing a monomer stream comprising an organic solvent and a polymerizable organic monomer; and a3) mixing together the protonic acid stream and monomer stream to form the organic stream for use in step (a).

In another example, the organic stream of step a) can be provided by:
a1) providing a protonic acid stream comprising an organic solvent and a protonic acid; a2) providing an aniline stream comprising an organic solvent and an unsubstituted or substituted aniline; and a3) mixing together the protonic acid stream and aniline stream to form the organic stream in step (a).

It will be appreciated that the organic stream can comprise one or more organic solvents. The organic stream may be a non-aqueous organic stream, for example a non-aqueous organic solution. The organic stream may be a non-aqueous organic solution comprising an organic solvent, polymerizable organic monomer and optionally protonic acid. For example, the non-aqueous organic solution can comprise one or more organic solvents, an unsubstituted or substituted aniline or salt thereof, and a protonic acid. The organic solvents may be selected from any one or more organic solvents as described herein, for example alcohols such as 2-butoxyethanol. The organic stream may comprise the polymerizable organic monomer as a neat organic liquid optionally with one or more organic solvents. The polymerizable organic monomer may be an organic monomer salt or a precursor mixture of an organic monomer (e.g. aniline) and a protonic acid (e.g. DNNSA). The organic stream comprising the polymerizable organic monomer may be in the form of an organic liquid concentrate. For example, the organic stream may contain the polymerizable organic monomer in a concentration (in weight % of total organic stream) of at least 30, 40, 50, 60, 70, 80, 85, 90, 95, 98, or 99. The organic stream may contain the organic monomer and protonic acid for forming the polymerizable organic monomer in a concentration (in weight % of combined weight of organic monomer and protonic acid in total organic stream) of at least 30, 40, 50, 60, 70, 80, 85, 90, 95, 98, or 99. The organic stream may be formed from mixing together a monomer stream and a protonic acid stream. The monomer stream may contain the polymerizable organic monomer in a concentration (in weight % of total monomer stream) of at least 70, 80, 85, 90, 95, 98, or 99. In one example, the monomer stream is provided by a neat organic liquid of the polymerizable organic monomer, such as aniline. The protonic acid stream may contain the protonic acid in a concentration (in weight % of total protonic acid stream) of at least 30, 40, 50, 60, 70, 80, 85, 90, 95, 98, or 99. It will be appreciated that one or more organic solvents as described herein can provide any remaining volume or weight % of the organic stream, other than any impurities that may be present.

Polymerizable Organic Monomers

As previously described, a conducting polymer prepared by the present continuous flow process may be selected from any conducting polymer being a reaction product of a protonated polymerizable organic monomer or salt thereof, and a free radical initiator. For example, the conducting polymer can be selected from the group consisting of a polyarylamine, polyarylthiol, polypyrrole, polycarbazole, polyindole, polyazepine, polythiophene, poly(3,4-ethylenedioxythiophene), and poly(3,4-propylenedioxythiophene).

The polymerizable organic monomer may therefore be an unsubstituted or substituted monocyclic, bicyclic, or tricyclic hetaryl monomer comprising at least one annular heteroatom selected from N and S. The polymerizable organic monomer can be an unsubstituted or substituted monocyclic, bicyclic, or tricyclic aryl monomer comprising at least one exocyclic heteroatom selected from N and S. The substitution can be selected from the group consisting of halo, hydroxyl, nitro, amino, alkyloxy, alkyl, carboxyl, haloalkyl, alkylaryl, and arylalkyl.

In one example, the polymerizable organic monomer is a monocyclic aryl monomer comprising at least one exocyclic heteroatom selected from N, for example unsubstituted or substituted aniline. In another example, the polymerizable organic monomer is a bicyclic hetaryl comprising at least one heteroatom selected from S, for example 3,4-ethylenedioxythiophene.

The polymerizable organic monomer may be provided by two or more comonomers. The polymerizable organic monomer may be a salt, for example an aniline-sulfate salt such as aniline-DNNSA.

The polymerizable organic monomer for step a) can be selected from the group consisting of an arylamine, arylthiol, pyrrole, carbazole, indole, azepine, thiophene, 3,4-ethylenedioxythiophene, 3,4-propylenedioxythiophene monomer, or any derivatives thereof, or any salt or combination thereof, and wherein each may be independently unsubstituted or substituted. In an example, the polymerizable organic monomer is selected from the group consisting of an aniline and 3,4-ethylenedioxythiophene, each of which may be unsubstituted or substituted.

Aniline Monomers

Aniline monomers may be unsubstituted or substituted anilines according to any examples as described herein.

The unsubstituted or substituted aniline monomers may be selected from a compound of Formula 1b:

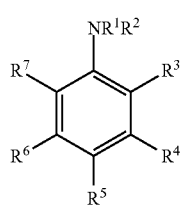

Formula 1b wherein
$R^1$ is hydrogen; and
$R^2$ is selected from the group consisting of hydrogen and alkyl; and
$R^3$, $R^4$, $R^5$, $R^6$, and $R^7$, are each independently selected from the group consisting of hydrogen, halo, hydroxyl, nitro, amino, alkyl, haloalkyl, alkyloxy, carboxyl, arylalkyl, and alkylaryl.

In another example, $R^3$, $R^4$, $R^5$, $R^6$, and $R^7$, are each independently selected from the group consisting of hydrogen, halo, hydroxyl, nitro, amino, alkyl, haloalkyl, alkyloxy, and carboxyl, and the remaining groups are as defined above.

In another example, $R^5$ is hydrogen, and the remaining groups are as defined above. In another example, the aniline is an unsubstituted aniline, for example wherein $R^1$ to $R^7$ of Formula 1 are each selected from hydrogen.

Polyphenylene Sulfide Monomers

Polyphenylene sulfide monomers may be unsubstituted or substituted polyphenylene sulfide monomers according to any examples as described herein.

The unsubstituted or substituted polyphenylene sulfide monomers may be selected from a compound of Formula 2b:

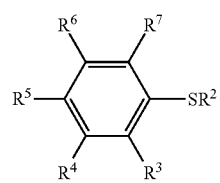

Formula 2b wherein
$R^2$ is selected from the group consisting of hydrogen and alkyl; and
$R^3$, $R^4$, $R^5$, $R^6$, and $R^7$, are each independently selected from the group consisting of hydrogen, halo, hydroxyl, nitro, amino, alkyl, haloalkyl, alkyloxy, carboxyl, arylalkyl, and alkylaryl.

Pyrrole Monomers

Pyrrole monomers may be unsubstituted or substituted pyrrole monomers according to any examples as described herein.

The unsubstituted or substituted pyrrole monomers can be selected from a compound of Formula 3b:

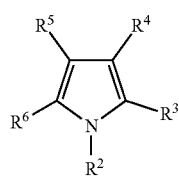

Formula 3b wherein
$R^2$ is selected from the group consisting of hydrogen and alkyl; and
$R^3$, $R^4$, $R^5$ and $R^6$, are each independently selected from the group consisting of hydrogen, halo, hydroxyl, nitro, amino, alkyl, haloalkyl, alkyloxy, carboxyl, arylalkyl, and alkylaryl.

Carbazole Monomers

Carbazole monomers may be unsubstituted or substituted carbazole monomers according to any examples as described herein.

The unsubstituted or substituted carbazole monomers can be selected from a compound of Formula 4b:

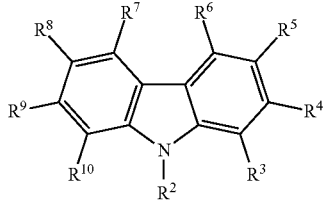

Formula 4b wherein

R² is selected from the group consisting of hydrogen and alkyl; and

R³, R⁴, R⁵, R⁶, R⁷, R⁸, R⁹ and R¹⁰ are each independently selected from the group consisting of hydrogen, halo, hydroxyl, nitro, amino, alkyl, haloalkyl, alkyloxy, carboxyl, arylalkyl, and alkylaryl.

Indole Monomers

Indole monomers may be unsubstituted or substituted indole monomers according to any examples as described herein.

The unsubstituted or substituted indole monomers can be selected from a compound of Formula 5:

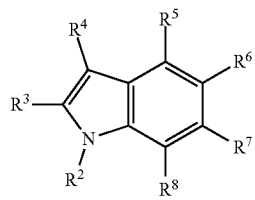

Formula 5b wherein

R² is selected from the group consisting of hydrogen and alkyl; and

R³, R⁴, R⁵, R⁶, R⁷ and R⁸ are each independently selected from the group consisting of hydrogen, halo, hydroxyl, nitro, amino, alkyl, haloalkyl, alkyloxy, carboxyl, arylalkyl, and alkylaryl.

Azepine Monomers

Azepine monomers may be unsubstituted or substituted azepine monomers according to any examples as described herein.

The unsubstituted or substituted azepine monomers can be selected from a compound of Formula 6b:

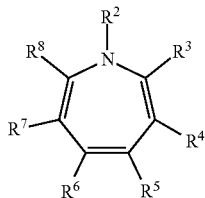

Formula 6b wherein

R² is selected from the group consisting of hydrogen and alkyl; and

R³, R⁴, R⁵, R⁶, R⁷ and R⁸ are each independently selected from the group consisting of hydrogen, halo, hydroxyl, nitro, amino, alkyl, haloalkyl, alkyloxy, carboxyl, arylalkyl, and alkylaryl.

Thiophene Monomers

Thiophene monomers may be unsubstituted or substituted thiophene monomers according to any examples as described herein.

The unsubstituted or substituted thiophene monomers may be selected from a compound of Formula 7b:

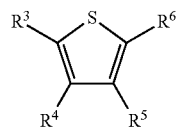

Formula 7b wherein

R³, R⁴, R⁵ or R⁶ are each independently selected from the group consisting of hydrogen, halo, hydroxyl, nitro, amino, alkyl, haloalkyl, alkyloxy, carboxyl, arylalkyl, and alkylaryl.

3,4-Ethylenedioxythiophene Monomers 3,4-Ethylenedioxythiophene monomers can be unsubstituted or substituted 3,4-Ethylenedioxythiophene monomers according to any examples as described herein.

The unsubstituted or substituted 3,4-Ethylenedioxythiophene monomers may be selected from a compound of Formula 8b:

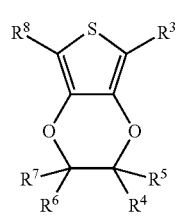

Formula 8b wherein

R³, R⁴, R⁵, R⁶, R⁷ and R⁸ are each independently selected from the group consisting of hydrogen, halo, hydroxyl, nitro, amino, alkyl, haloalkyl, alkyloxy, carboxyl, arylalkyl, and alkylaryl.

3,4-Propylenedioxythiophene Monomers 3,4-Propylenedioxythiophene monomers can be unsubstituted or substituted 3,4-Propylenedioxythiophene monomers according to any examples as described herein.

The unsubstituted or substituted 3,4-Propylenedioxythiophene monomers may be selected from a compound of Formula 9b:

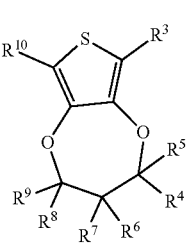

Formula 9b wherein

R³, R⁴, R⁵, R⁶, R⁷, R⁸, R⁹ and R¹⁰ are each independently selected from the group consisting of hydrogen, halo, hydroxyl, nitro, amino, alkyl, haloalkyl, alkyloxy, carboxyl, arylalkyl, and alkylaryl.

Organic Solvents

The organic solvent is selected to provide a carrier for the polymerizable organic monomer, for example an aniline monomer. The organic solvent may also be selected to provide a carrier for the protonic acid in addition to the monomer.

In an example, the organic solvent is a non-aqueous organic solvent. The organic solvents can be selected from various water immiscible solvents. The non-aqueous organic solvents can provide an emulsion with an aqueous stream, rather than providing a single phase, and as such are immiscible with the aqueous stream or phase.

The organic solvents can be selected from the group comprising aromatics, chlorinated aromatics, chlorinated aliphatic hydrocarbons, aliphatic hydrocarbons, glycols, ethers, glycol ethers, esters, alcohols, and ketones. The alcohols can be water immiscible alcohols having at least a medium alkyl chain or aryl group. The water immiscible alcohols can be n-butanol or larger alkyl chain alcohols. The ketones can be water immiscible ketones having at least medium chain ketones such as methyl ethyl ketone or ketones with larger alkyl chains. In one example, the organic solvent is a glycol ether, such as 2-butoxy ethanol.

The organic solvent can be selected from any one or more of aromatics, halogenated aromatics, halogenated aliphatic hydrocarbons, aliphatic hydrocarbons, glycols, ethers, glycol ethers, esters, alcohols, ketones, or combinations thereof. In another example, the organic solvent can be selected from the group consisting of glycols, ethers, glycol ethers, and combinations thereof.

The organic solvent can also be selected to dissolve an acid dopant (i.e. protonic acid), for example a protonic acid of DNNSA can be provided in the organic solvent such as glycol ethers (e.g. 2-butoxyethanol), hydrocarbons (e.g. heptane), or aromatic hydrocarbons (e.g. toluene or xylene). The protonic acid may be introduced into the process neat or in a concentrated form, for example without dilution in an organic solvent. In at least some examples, the use of a more concentrated or solvent free protonic acid can increase the reaction rate, reducing reaction time and improving product throughput. This can also increase the reaction exotherm and lead to loss of control of the polymerisation due to the temperature increase, which can be compensated for according to embodiments or examples of the continuous flow process as described herein. Temperature increase or lack of temperature control can lead to poor batch to batch reproducibility, lower polymer molecular weight and in turn lower polymer conductivity.

Following the reaction process, the organic solvents can be used to dilute the product in order to give the desired final concentration and properties.

Other suitable exemplary liquid solvents include aromatics, such as xylene, toluene or alkylnaphthalenes; chlorinated aromatics or chlorinated aliphatic hydrocarbons, such as chlorobenzenes, chloroethylenes or methylene chloride; aliphatic hydrocarbons, such as cyclohexane or paraffins, for example mineral oil fractions; alcohols, such as butanol, isobutanol, or glycol and also their ethers and esters, such as 2-butoxy ethanol; ketones, such as methyl ethyl ketone, methyl isobutyl ketone or cyclohexanone. In one example, the organic solvent is selected from the group consisting of alcohols, glycols, ethers, glycol ethers, and any combinations thereof.

Protonic Acid

It will be appreciated that the protonic acid is selected to provide a proton source to facilitate formation of a polymerizable organic monomer salt, which itself is capable of polymerization to a conducting polymer, for example in the presence of an oxidant. The protonic acid can also be selected to act as a dopant for the conducting polymer or surfactant to facilitate emulsion of aqueous and organic streams.

The protonic acid can be selected from the group consisting of sulfonic acids, phosphoric acids, phosphonic acids, boronic acids, carboxylic acids, thiols, phenols, heteropoly acids (e.g. silicotungstic acid), or any mixtures thereof. The protonic acid may include polymers functionalized with any of the above mentioned acidic groups. The protonic acid can be a hydrophobic organic acid. It will be appreciated that the hydrophobic organic acid can react with a base form of a polymerizable organic monomer or conducting polymer to form a salt that is at least partially soluble in at least some organic solvents. At least according to some examples as described herein, the continuous flow process can allow in situ (i.e. in-stream) formation of an organic soluble polymerizable monomer salt that itself can be polymerized during the continuous flow process into an organic soluble electrically conducting polymer form that is more readily processable.

The protonic acid can be selected from the group consisting of dinonylnapthalenesulfonic acid (DNNSA), dinonylnapthalenedisulfonic acid, methanesulfonic acid, benzenesulfonic acid, dodecylbenzenesulfonic acid (DBSA), p-toluenesulfonic acid, trifluoromethanesulfonic acid, fluoroboric acid, trifluoroacetic acid, pentafluoropropionic acid, heptafluorobutyric acid, perfluorooctanoic acid, acetic acid, chloroacetic acid, dichloroacetic acid, trichloroacetic acid, and phosphoric acid, or any combinations thereof. The protonic acid can be selected from the group consisting of dinonylnapthalenesulfonic acid, dinonylnapthalenedisulfonic acid, methanesulfonic acid, benzenesulfonic acid, dodecylbenzenesulfonic acid, and p-toluenesulfonic acid, or any mixtures thereof. The protonic acid can be dinonylnapthalenesulfonic acid (DNNSA).

An organic solvent may be used to dissolve a protonic acid, although it will be appreciated that in some examples a protonic acid can be introduced into a stream neat and without dilution into an organic solvent. In some or examples, such as where a polymerizable organic monomer salt is prepared before introducing into the organic stream, a protonic acid may not be required.

Concentration and Ratios for Organic Stream

The concentration (in mol/L) of the polymerizable organic monomer in the organic stream may be in a range of about 0.01 to 15. The concentration (in mol/L) of the polymerizable organic monomer may be at least about 0.01, 0.05, 0.1, 0.5, 1, 1.5, 2, 2.5, 3, 3.5, 4, 4.5, 5, 6, 7, 8, 9, 10, 11, 12, 13, or 14. The concentration (in mol/L) of the polymerizable organic monomer may be less than about 15, 14, 13, 12, 11, 10, 9, 8, 7, 6, 5, 4.5, 4, 3.5, 3, 2.5, 2, 1.5, 1, 0.5, 0.1, or 0.05. The concentration (in mol/L) of the polymerizable organic monomer in the organic stream may be in a range provided by any two of the above maximum and/or minimum values. Increasing the concentration of organic monomer in solution will increase the rate of polymerisation and throughput of the process, although will also generate a more detrimental exotherm that can increase impurities and degrade products obtained from the process.

In further examples relating to the preparation of polyaniline, the concentration (in mol/L) of aniline or salt thereof may be in a range of about 0.25 to 1, 0.4 to 1, or 0.6 to 1. The concentration (in mol/L) of the aniline or salt thereof in the organic stream may be at least about 0.25, 0.3, 0.35, 0.4, 0.45, 0.5, 0.55, 0.6, 0.65, 0.7, 0.75, 0.8, 0.85, 0.9, or 0.95. The concentration (in mol/L) of the aniline or salt thereof in the organic stream may be less than about 3, 2.5, 2, 1.5, 1, 0.9, 0.8, 0.7, or 0.6. The concentration (in mol/L) of the aniline or salt thereof in the organic stream (or emulsion stream thereof) may be in a range provided by any two of the above maximum and/or minimum values.

The concentration (in mol/L) of the protonic acid in the organic stream may be in a range of about 0.02 to 20 mol/L. The concentration (in mol/L) of the protonic acid may be at least about 0.02, 0.05, 0.1, 0.5, 1, 1.5, 2, 2.5, 3, 3.5, 4, 4.5, 5, 6, 7, 8, 9, or 10. The concentration (in mol/L) of the protonic acid may be less than about 20, 17.5, 15, 12.5, 10, 9, 8, 7, 6, 5, 4.5, 4, 3.5, 3, 2.5, 2, 1.5, 1, 0.5, or 0.1. The concentration (in mol/L) of the protonic acid in the organic stream may be in a range provided by any two of the above maximum and/or minimum values.

In further examples where the protonic acid is an organic soluble protonic acid (e.g. DNNSA), the concentration (mol/L) of the organic soluble protonic acid may be provided in a range of about 0.02 to 5, such as a range of about 0.3 to 3, 0.4 to 2, or 0.5 to 1. The concentration (in mol/L) of the organic soluble protonic acid may be at least about 0.02, 0.04, 0.06, 0.08, 0.1, 0.2, 0.3, 0.4, 0.5, 0.6, 0.7, 0.8, 0.9, 1, 1.5, 2, 2.5, or 3. The concentration (in mol/L) of the organic soluble protonic acid may be less than about 5, 4.5, 4, 3.5, 3, 2.5, 2, 1.5, 1, 0.9, 0.8, 0.7 0.6, 0.5, 0.4, 0.3, 0.2, or 0.1. The concentration (in mol/L) of the organic soluble protonic acid in the organic stream may be in a range provided by any two of the above maximum and/or minimum values.

The molar ratio of protonic acid to polymerizable organic monomer may be at least 1:1, for example at least about 1.5:1, 2:1, 2.5:1, 3:1, 3.5:1, or 4:1. The molar ratio of protonic acid to polymerizable organic monomer may be in a range of about 1:1 to 4:1, 1.1:1 to 3:1, 1.2:1 to 2:1, or about 1.3:1 to 1.7:1, or about 1.5:1. The protonic acid can simultaneously act as a surfactant (emulsifier) and as a protonating agent for the resulting PANI-protonic acid complex, for example. Changing the ratio of protonic acid to organic monomer will impact both the molecular weight and solubility of the resulting polymer.

The above concentrations and ratios may also be provided for synthesising polyaniline, namely the concentrations and ratios in relation to an aniline monomer. The molar ratio of protonic acid to aniline (e.g. DNNSA) may also be as described above.

(B) Oxidant Stream

It will be appreciated that the oxidant stream in step (b) provides a fluidic carrier for a free radical initiator, for example an oxidising agent such as ammonium persulfate. The oxidant stream may be provided as an aqueous stream. The aqueous stream may comprise an aqueous solvent and the free radical initiator. The aqueous solvents can be selected to enable an emulsion to be formed under certain flow and mixing parameters when the aqueous stream is mixed with an organic stream.

Free Radical Initiator

It will be appreciated that the free radical initiator may be an oxidising agent such as ammonium persulfate. The oxidising agent provides a reagent for initiating polymerization of a polymerizable monomer salt, such as polymerization of an anilinium monomer to polyaniline.

The oxidising agent may be selected from the group consisting of persulfates, dichromates, cerium (IV) salts, oxyhalide salts, and halide salts, iron (III) salts, or any combinations thereof.

The oxidising agent may be selected from the group consisting of APS, potassium dichromate, potassium iodate, ferric chloride, ferric tosylate, potassium permanagate, potassium bromate, potassium chlorate, cerium ammonium nitrate, cerium sulphate.

In one example, the oxidising agent is ammonium persulfate (APS). In at least some examples, APS can provide for reduced overheads and ease of use at an industrial scale operation.

The concentration (in mol/L) of the free radical initiator (e.g. APS) may be in a range of about 0.1 to 5. The concentration (in mol/L) of the free radical initiator in the oxidant stream may be at least about 0.1, 0.2, 0.3, 0.4, 0.5, 0.6, 0.7, 0.8, 0.9, 1, 1.5, 2, 2.5, 3, 3.5, or 4. The concentration (in mol/L) of the free radical initiator in the oxidant stream may be less than about 3, 2.5, 2, 1.5, 1, 0.9, 0.8, 0.7, 0.6, or 0.5. The concentration (in mol/L) of the free radical initiator in the oxidant stream may be in a range provided by any two of the above maximum and/or minimum values, such as 0.4 to 4, 0.7 to 3, or 0.5 to 1.5.

In further examples, the ratio of the polymerizable organic monomer to the free radical initiator may be in a range of about 1:10 to 4:1, such as 1:2 to 2:1 or 1:1 to 2:3. In further examples for preparing polyaniline, the ratio of the aniline monomer or salt thereof to the free radical initiator (e.g. APS) may be in a range of about 1:1 to 1.5, such as 1:1 to 1:1.4, 1:1 to 1:3, or 1.1 to 1:4.

Aqueous Solvents

The aqueous solvent may be provided by water or at least an aqueous solvent system comprising predominantly water. For example, the aqueous solvent system may comprise water in an amount of at least (by weight % of the total aqueous solvent system) 50, 60, 70, 80, 90, 95, 98, or 99. The remainder of the aqueous solvent system may comprise other solvents or incidental impurities.

(C) Product Stream

In one example, an emulsion stream may be formed from mixing together an oxidant stream and an organic stream, or a product stream thereof. It will be appreciated that the product stream is formed on mixing together an organic stream comprising the polymerizable organic monomer and an oxidant stream comprising the free radical initiator.

Where the oxidant stream is an aqueous stream, then the mixing together of the aqueous stream comprising the free radical initiator and the organic stream comprising the polymerizable organic monomer in a continuous flow can provide a product stream for synthesising a conducting polymer or salt thereof comprising an emulsion formed by the mixing together of the organic and aqueous streams.

The product stream can provide for the synthesis of the conducting polymers as previously described. The conducting polymers can be organic soluble. The conducting polymers can be in an electrically conductive form (e.g. emeraldine form of polyaniline). The conducting polymer may be a salt. The salt form of the conducting polymer may also be soluble in organic solvents. For example, the salt form can be prepared from a protonic acid that is a hydrophobic organic acid. The hydrophobic organic acid can provide a counterion to the monomer or polymer that enables neutrality of a protonated form and solubility in at least some organic solvents. The conducting polymer may be a copolymer or polymer blend. For example, in relation to polyaniline, the conducting polymer can be formed from a monomer salt to provide a polyaniline emeraldine salt, which may be soluble in organic solvents and more readily processable.

In relation to a polyaniline emeraldine salt, which is also known as PANI-ES, one example is PANI-DNNSA, in which the protonic acid is DNNSA (and doping of the polymer), namely dinonylnaphthalenesulfonic acid. PANI-DNNSA is an example of an organic soluble conducting polymer prepared by the continuous flow process.

The concentration of conducting polymer in the product stream may be about 15 to 75 wt % (based on previously described suitable concentrations of polymerizable organic monomer in the organic stream). The concentration of conducting polymer in the product stream may be at least about 20, 30, 40, 50, 60, or 70 wt % (based on previously described suitable concentrations of polymerizable organic monomer in the organic stream). The concentration of conducting polymer in the product stream may be in a range of about 30 to 75, 35 to 70, 40 to 65, or 45 to 60 wt % (based on previously described suitable concentrations of polymerizable organic monomer in the organic stream).

The concentration of polymerizable organic monomer in the product stream exiting the temperature controlled continuous flow reactor may be negligible, for example may even be below the limit of detection (LOD) using a 400 MHz nuclear magnetic resonance (NMR) spectrometer under standard conditions as determined by NMR spectroscopy. The product stream exiting the temperature controlled continuous flow reactor may be substantially free of any unreacted polymerizable organic monomer. The conversion of polymerizable organic monomer to conducting polymer (or yield) may be at least about 70%, 75%, 80%, 85%, 90%, 95%, 98%, 99%, 99.5%, or 99.9%. It will be appreciated that some of the polymerizable organic monomer may be polymerised into low molecular weight products such as a dimer or smaller oligomers. The low molecular weight products may be removed by further processing, such as an aqueous washing process. A high conversion of polymerizable organic monomer to conducting polymer is desirable not just for the process economics but also to ensure that no significant amounts of monomer or low molecular weight products remain in the final polymeric product, which are known to be harmful.

The composition and constituency of the conducting polymer material can also be described by its dispersity value (also referred to as Polydispersity Index—PDI), which provides an indication of the distribution of various polymer molecular weights in the conducting polymer material and can be measured by determining and dividing the weight average molecular mass by the number average molecular mass. It will be appreciated that the weight average molecular mass and number average molecular mass can be determined from a sample mixture of the conducting polymer by various chromatographic or spectrometric methods, such as HPLC or NMR methods.

The polydispersity of the conducting polymer may be in a range of about 1 to 15, 1 to 10, 1 to 5, or 1 to 3. The polydispersity may be less than about 15, 13, 14, 13, 12, 11, 10, 9, 8, 7, 6, 5, 4, 3, 2, or 1.5. The dispersity may be at least about 1.5, 2, 3, 4, 5, 6, 7, 8, 9, 10, 11, 12, 13, or 14. The dispersity may be provided at a range between any two of these upper and lower limits as hereinbefore described. The lower polydispersity can provide more consistency in the properties including solubility of the conducting polymers.

The conducting polymer may have a bulk sample conductivity (untreated thin film measured at 20° C.) of between about $1 \times 10^{-6}$ S/cm to $1 \times 10^{-2}$ S/cm. For example, the bulk sample conductivity (untreated thin film measured at 20° C.) may be at least about $1 \times 10^{-5}$ S/cm, $1 \times 10^{-4}$ S/cm, or $1 \times 10^{-3}$ S/cm.

The conducting polymer may have a bulk sample conductivity (iso-propanol treated thin film measured at 20° C.) of between about 0.1 S/cm to 15 S/cm. The bulk sample conductivity (iso-propanol treated thin film measured at 20° C.) may be at least about 1, 2, 3, 4, 5, 6, 7, 8, 9, 10, 11, 12, or 13 S/cm. Treatment of conducting polymer films with iso-propanol has been found to increase thin film conductivity by removing excess dopant from the film leading to improved charge transfer in the remaining polymer.

For the preparation of conducting polymer, suitable molar ratios of the polymerizable organic monomer (e.g. aniline), protonic acid (e.g. DNNSA) and free radical initiator (e.g. APS) may be polymerizable organic monomer (1.0 eq), protonic acid (1.0 eq-4.0 eq), and free radical initiator (0.5 eq-2.0 eq). For example, the ratios can be polymerizable organic monomer (1.0 eq), protonic acid (1.5 eq) and free radical initiator (1.2 eq).

The operating temperatures for preparing the conducting polymer in the continuous flow process may be set to operate within a narrow temperature range, for example within a temperature variation of less than 10° C., 9° C., 8° C., 7° C., 6° C., 5° C., 4° C., 3° C., 2° C., or 1° C. In one example the temperatures of the product stream may have less than about 10° C., for example less than about 5° C., 4° C., 3° C., 2° C., or 1° C. In one example, the reaction temperature within the product stream is maintained between about −5° C. and 5° C. with less than about 5° C. of temperature variation during the reaction. In another example, the reaction temperature within the product stream is maintained between about −3° C. and 3° C. with less than about 3° C. of temperature variation during the reaction. In another example, the reaction temperature within the product stream is maintained at about 0° C. with less than about 1.0° C. of temperature variation during the reaction. The above temperature ranges and variations may be provided for any individual or mixed stream, for example the emulsion stream and/or product stream. In one particular example, the temperature range and/or temperature variation is provided across the axial flow length of the tubular reactor containing the emulsion stream and/or product stream. The polymerization temperature has a strong effect on both the polymerization yield and the molecular weight of the polymer. Both the yield and molecular weight decrease with increasing reaction temperature. Controlling the temperature variation during the reaction is also important for the above mentioned reasons. Improved control of the temperature including variation across the axial flow length has surprisingly shown to provide conducting polymers from the product stream that have improved electro-conductivities and/or with reduced solids content, for example reduced amounts of low molecular weight products. It will be appreciated that "low molecular weight products" may comprise oligomers of up to about 20 monomer units, such 10 monomer units or less, and in particular dimers, trimers and tetramers. The amount of polymerizable organic monomer or low molecular weight products in the product stream may be less than (by weight % of product stream) 5, 4, 3, 2, 1, 0.5, 0.1, 0.05, 0.01, 0.005, or 0.001. Further processing of the product stream may further reduce such low molecular weight products or other undesirable impurities from any organic soluble conducting polymer present in the product stream.

The residence time of the reactants in the product stream may be between about 0.5 h-3.0 h (depending on mixing efficiency). In other examples, the residence time of the product stream may be between about 0.75 h-2.0 h, 0.8 h to 1.5 h, or 0.85 to 1.2 h. The residence time of the reactants in the product stream (in h) may be less than 10, 9, 8, 7, 6, 5, 4, 3, 2, or 1. The residence time of the reactants in the product stream (in h) may be at least 0.1, 0.5, 1, 2, 3, 4, 5, 6, 7, 8, or 9. The residence time of the reactants in the product stream (in h) may be provided in a range between any two of these upper and/or lower values. The residence time is determined by the reaction kinetics and the geometry of the continuous flow reactor such that the polymerization reaction is complete prior to the product stream exiting the continuous reactor system.

In one example, the flow rate (ml/min) may be in the range of about 1 to 1000, 2 to 500, 3 to 300, 4 to 200, or 5 to 100. The flow rate (ml/min) may be less than 1000, 750, 500, 400, 300, 200, 100, 75, 50, or 25. The flow rate (ml/min) may be greater than 1, 5, 10, 15, 20, 25, 50, or 75. The flow rate may be in a range provided by any two of these upper and/or lower values.

In one example, the flow rate (m/s) may be in the range of about 0.001 to 0.1, 0.005 to 0.5, or 0.01 to 0.05. The flow rate (m/s) may be less than 0.1, 0.09, 0.08, 0.07, 0.06, 0.05, 0.04, 0.03, or 0.02. The flow rate (m/s) may be greater than 0.001, 0.002, 0.003, 0.004, 0.005, 0.006, 0.007, 0.008, 0.009, or 0.01. The flow rate may be in a range provided by any two of these upper and/or lower values.

For the continuous flow tubular reactor, the internal diameter of the tubular reactor may be at least about 2 mm, 3 mm, 4 mm, 5 mm, 6 mm, 7 mm, 8 mm, 9 mm, or 10 mm. The internal diameter of the tubular reactor may be between about 2 and 25 mm, 5 to 20 mm, or 5 to 10 mm. The internal diameter of the tubular reactor along with the static mixer design effects the mixing performance of the reactor. At a given fluid velocity smaller diameter tubes will have more efficient mixing through higher shear and more turbulent flow conditions than larger diameter tubes.

For the continuous flow process or system, the minimum internal diameter of any portion of the continuous flow system may be at least about 1 mm, 2 mm, 3 mm, 4 mm, or 5 mm. The internal diameter of any portion of the continuous flow system may be between about 1 and 25 mm, 2 to 15 mm, or 5 to 10 mm. The diameter of portions of the continuous flow system may be varied in order to change the mixing performance. In order to increase mixing performance and generate a fine emulsion sections of tubing containing static mixers of a smaller diameter than the main tubular reactor system may be used.

The process may provide at least about 30 g of conducting polymer per hour of operation, for example wherein the operation performance is with respect to a continuous flow reactor volume of about 100 ml to 3000 ml. In an example, the process provides on a per hour of operation per litre of internal volume of the tubular reactor basis, at least about 30 g, 40 g, 50 g, 60 g, 70 g, 80 g, 90 g, 100 g, 110 g, 120 g, or 130 g, of conducting polymer or conducting polymer salt. It will be appreciated that higher production rates provide additional economic and supply advantages.

The space time yield (STY, in g/Lh) may be at least about 30. Space time is the time necessary to process one reactor volume of fluid, given a particular set of input conditions. STY is the amount in grams of conducting polymer synthesized per litre of emulsion or product stream passing through the reactor per hour. STY can be calculated using the following formula:

$$S.T.Y. = \frac{m_p \cdot \dot{V}}{V_R \cdot V_{SS}} = \frac{m_p}{t_R \cdot V_R} \text{ note that } \dot{V} = \frac{V_{SS}}{T_R}$$

where:
$m_p$=the product mass (kg)
$\dot{V}$=the total volumetric flow rate (L/h)
$V_R$=the reactor volume (L)
$V_{SS}$=the total stock solution volume processed (L)
$t_R$=the total processing time (h)

In an example, the STY is at least about 50, 55, 60, 65, 70, 75, 80, 85, 90, 95, 100, 105, 110, 115, 120, 125, or 130, of conducting polymer or conducting polymer salt. In another example, the STY is less than about 130, 125, 120, 115, 110, 105, 100, 95, 90, or 85, of conducting polymer or conducting polymer salt. STY may be in a range provided by any two of these upper and/or lower values, such as between about 50 to 130, 60 to 125, or 70 to 115.

Synthesised Polyaniline

The polyaniline emeraldine salt prepared from the continuous flow process may be provided as a solution in an organic solvent or as a solid. The polyaniline emeraldine salt has a green appearance.

The prepared polyaniline emeraldine salt may have a number average molecular weight of at least 10,000. For example, number average molecular weight may be at least about 20,000, 30,000, 40,000, 50,000, 60,000, or 70,000. The number average molecular weight may be in a range of about 10,000 to 100,000, 20,000 to 100,000, 30,000 to 100,000, 40,000 to 100,000, 50,000 to 100,000, or 60,000 to 100,000. The number average molecular weight may be less than about 100,000, 90,000, 80,000, 70,000, 60,000, 50,000, or 40,000. The number average molecular weight may be in a range provided by any lower and upper limit as previously described. It will be appreciated that lower molecular weight products may provide an undesirable level of toxicity and higher molecular weight products may be less processable.

The composition and constituency of the conducting polymer material can also be described by its dispersity value (also referred to as Polydispersity Index—PDI), which provides an indication of the distribution of various polymer molecular weights in the conducting polymer material and can be measured by determining and dividing the weight average molecular mass by the number average molecular mass. It will be appreciated that the weight average molecular mass and number average molecular mass can be determined from a sample mixture of the conducting polymer by various chromatographic or spectrometric methods, such as HPLC or NMR methods.

The polydispersity of the prepared polyaniline emeraldine salt may be in a range of about 1 to 15, 1 to 10, 1 to 5, or 1 to 3. The polydispersity may be less than about 15, 13, 14, 13, 12, 11, 10, 9, 8, 7, 6, 5, 4, 3, 2, or 1.5. The dispersity may be at least about 1.5, 2, 3, 4, 5, 6, 7, 8, 9, 10, 11, 12, 13, or 14. The dispersity may be provided at a range between any two of these upper and lower limits as hereinbefore described. The lower polydispersity can provide more consistency in the properties including solubility of the conducting polymers.

The prepared polyaniline emeraldine salt may have a bulk sample conductivity (untreated thin film measured at 20° C.) of between about $1\times10^{-6}$ S/cm to $1\times10^{-2}$ S/cm. For example, the bulk sample conductivity (untreated thin film measured at 20° C.) may be at least about $1\times10^{-5}$ S/cm, $1\times10^{-4}$ S/cm, or $1\times10^{-3}$ S/cm.

The prepared polyaniline emeraldine salt may have a bulk sample conductivity (iso-propanol treated thin film measured at 20° C.) of between about 0.1 S/cm to 10 S/cm. The bulk sample conductivity (iso-propanol treated thin film measured at 20° C.) may be at least about 2, 3, 4, 5, 6, 7, 8, 9, 10, or 11 S/cm. Treatment of polyaniline films with iso-propanol has been found to increase thin film conductivity by removing excess dopant from the film leading to improved charge transfer in the remaining polymer.

The concentration of polyaniline in the product stream may be about 15 to 75 wt % (based on previously described suitable concentrations of aniline in the organic stream). The concentration of polyaniline in the product stream may be at least about 20, 30, 40, 50, 60, or 70 wt % (based on previously described suitable concentrations of aniline in the organic stream). The concentration of polyaniline in the product stream may be in a range of about 30 to 75, 35 to 70, 40 to 65, or 45 to 60 wt % (based on previously described suitable concentrations of aniline in the organic stream).

The concentration of aniline in product stream (unreacted aniline) may be negligible, for example below the limit of detection (LOD) using a 400 MHz nuclear magnetic resonance (NMR) spectrometer under standard conditions as determined by NMR spectroscopy. The product stream may be substantially free of any unreacted aniline. The conversion of aniline monomer to polyaniline (or yield) may be at least about 80%, 85%, 90%, 95%, 98%, 99%, or 99.9%. It will be appreciated that some of the aniline may be polymerised into a dimer or smaller oligomers that can be removed by further processing, such as an aqueous washing process. A high conversion of aniline monomer to polyaniline is desirable not just for the process economics but also to ensure that no significant amounts of aniline monomer or oligomers remain in the final polymeric product, which are known to be harmful.

For the preparation of polyaniline, suitable example molar ratios of the aniline monomer, protonic acid (e.g. DNNSA) and free radical initiator (e.g. APS) may be aniline (1.0 eq), DNNSA (1.0 eq-4.0 eq), and APS (0.5 eq-2.0 eq). For example, the ratios can be aniline (1.0 eq), DNNSA (1.5 eq) and APS (1.2 eq).

It will be appreciated that previous examples regarding process conditions for the conducting polymer and polymerizable organic monomer may also apply to the process for preparing polyaniline from aniline or salt thereof. For example, any one or more of the above mentioned operating temperatures, residence times, flow rates, yields, and tubing diameters, may apply to the preparation of polyaniline.

(D) Flow Reactor

The continuous flow process comprises a temperature controlled continuous flow reactor for facilitating controlled synthesis of the conducting polymer or salt thereof. The temperature controlled continuous flow reactor may be a temperature controlled continuous flow tubular reactor. The continuous flow process can comprise a continuous flow reactor, or continuous flow tubular reactor, comprising one or more passages in fluidic communication for carrying the reactant and product streams. At least a portion of one of more of the passages may be configured to enhance mixing of the streams, for example a static mixer configuration to enhance radial mixing, chaotic advection or emulsion formation.

A continuous flow reactor (also referred to as a continuous flow chemical reactor) can comprise one or more chamber sections in fluidic communication with each other. At least one chamber section can comprise a static mixer element. The chamber sections may be referred to as chamber modules, wherein each module may contain one or more static mixer elements (e.g. 5 static mixers). The static mixer element may be configured for inserting into a continuous flow chemical reactor, and may be referred to as a "static mixer insert". The static mixer elements or inserts can be provided in the form of one or more modules. It will be appreciated that the static mixer can be provided as an integral part of the chemical reactor. The static mixer and chamber section together can form the reactor chamber, and may be provided as a single unit. The chamber section may provide the housing for the static mixer. The chamber section may include a heat exchanger system, which may be used for controlling heat removed from the reactor chamber during its operation. The one or more static mixer elements or chamber sections may be configured for use in series or parallel operation. It will be appreciated that the static mixer, or reactor thereof, may comprise one or more reactant inlets for supply of one or more fluidic reactants to a chamber section, and one or more outlets in fluid communication with the static mixer for receiving an output stream comprising a product or products of the reaction. It will be appreciated that a continuous flow mixer comprises at least one mixing element (e.g. a static or dynamic mixer). It will also be appreciated that the continuous flow mixer comprising a static mixer may be provided with a static mixer or static mixer element according to any embodiments or examples thereof as described herein.

The static mixers can provide an integral element as part of a chemical reactor chamber. The static mixer element for a continuous flow chemical reactor chamber may comprise an optionally catalytically active scaffold defining a plurality of passages configured for dispersing and mixing one or more fluidic reactants during flow and reaction thereof through the mixer. The surface of the scaffold may optionally comprise a catalytic material. The catalytic material may be selected from at least one of a metal, metal alloy, or metal oxide, for providing the surface of the scaffold with catalytically reactive sites.

The static mixer may be provided as one or more elements each configured for inserting into a continuous flow chemical reactor or reactor chamber thereof. The static mixer element may be configured as a modular insert for assembly into a continuous flow chemical reactor or chamber thereof. The static mixer element may be configured as an insert for an in-line continuous flow chemical reactor or chamber thereof.

The continuous flow process or temperature controlled continuous flow reactor may comprise a recycle loop reactor or a single pass reactor. In one example, the continuous flow process is operated as a single pass process. In another example, the temperature controlled continuous flow reactor is a single pass reactor. The use of a single pass continuous flow process or a temperature controlled continuous flow reactor as a single pass reactor can provide further advantages, such as with efficiencies and in industrial type operations.

The static mixer element may be configured for enhancing mixing (e.g. chaotic advection) and heat transfer characteristics for redistributing fluid in directions transverse to the main flow, for example in radial and tangential or azimuthal directions relative to a central longitudinal axis of the static mixer element. The static mixer element can be configured for enhancing mixing, chaotic advection, or emulsion formation of reactant streams, or to facilitate heat transfer away from or to the fluid efficiently. The static mixer element may be provided with various geometric configurations or aspect ratios for correlation with particular applications. The static mixer element may be configured for use with turbulent flow rates, for example enhancing turbulence and mixing, even at or near the internal surface of the reactor chamber housing. It will also be appreciated that the static mixer element can be configured to enhance the heat and mass transfer characteristics for both laminar and turbulent flows.

The configurations may also be designed to enhance efficiency, degree of chemical reaction, or other properties such as pressure drop (whilst retaining predetermined or desired flow rates), residence time distribution or heat transfer coefficients.

The static mixer element, scaffold, reactor chamber, or continuous flow reactor thereof, may be formed by additive manufacturing, as also described in sections below. The static mixer may be an additive manufactured static mixer. Additive manufacturing of the static mixer and optional catalytic coating can provide a static mixer that is configured for efficient mixing, heat transfer and optionally catalytic reaction (of reactants in continuous flow chemical reactors), and in which the static mixer may be physically tested for reliability and performance, and optionally further re-designed and re-configured using additive manufacturing (e.g. 3D printing) technology. Additive manufacturing provides flexibility in preliminary design and testing, and further re-design and re-configuration of the static mixers to facilitate development of more commercially viable and durable static mixers.

The dimensions of the continuous flow reactor, continuous flow mixer (e.g. continuous flow tubular reactor comprising a static mixer) or static mixer may be varied depending on the application. The static mixer, or continuous flow reactor comprising the static mixer, may be tubular. The static mixer, continuous flow mixer or continuous flow reactor, for example, may have a diameter (in mm) in the range of 1 to 1000, 2 to 500, 3 to 250, 4 to 150, or 5 to 100. The static mixer, continuous flow mixer or continuous flow reactor, for example, may have a diameter (in mm) of at least about 1, 5, 10, 25, 50, 75, 100, 250, or 500. The static mixer, continuous flow mixer or continuous flow reactor may, for example, have a diameter (in mm) of less than about 1000, 750, 500, 250, 200, 150, 100, 75, 50, 25, or 10. The aspect ratios (L/d) of the static mixer elements, mixers, reactors, or reactor chambers comprising the static mixer elements, may be provided in a range suitable for industrial scale flow rates for a particular reaction. The aspect ratios may, for example, be in the range of about 1 to 1000, 2 to 750, 3 to 500, 4 to 250, 5 to 100, or 10 to 50. The aspect ratios may, for example, be less than about 1000, 750, 500, 250, 200, 150, 100, 75, 50, 25, 20, 15, 10, 9, 8, 7, 6, 5, 4, 3, or 2. The aspect ratios may, for example, be greater than about 1, 2, 3, 4, 5, 6, 7, 8, 9, 10, 15, 20, 25, 50, 75, or 100.

The static mixer elements, continuous flow mixers or continuous flow reactors may be configured for enhancing properties, such as mixing (e.g. chaotic advection and emulsion formation) and heat transfer, for laminar flow rates or turbulent flow rates. It will be appreciated that for Newtonian fluids flowing in a hollow pipe, the correlation of laminar and turbulent flows with Reynolds number (Re) values would typically provide laminar flow rates where Re is <2300, transient where 2300<Re<4000, and generally turbulent where Re is >4000. The static mixer elements, continuous flow mixers or continuous flow reactors may be configured for laminar or turbulent flow rates to provide enhanced properties selected from one or more of mixing, degree of reaction, heat transfer, and pressure drop.

In one example, the static mixer elements, continuous flow mixers or continuous flow reactors may be generally configured for operating at a Re of at least 0.01, 0.1, 1, 5, 50, 100, 150, 200, 250, 300, 350, 400, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, 10000. The static mixer elements, continuous flow mixers or continuous flow reactors may be configured for operating in a generally laminar flow Re range of about 0.1 to 2000, 1 to 1000, 10 to 800, or 20 to 500. The static mixer elements, continuous flow mixers or continuous flow reactors may be configured for operating in a generally turbulent flow Re ranges of about 1000 to 15000, 1500 to 10000, 2000 to 8000, or 2500 to 6000.

In some embodiments, the static mixer elements, continuous flow mixers or continuous flow reactors may be described by the Péclet number (Pe), which is another class of dimensionless numbers relevant to transport phenomena in a continuum. The Péclet number provides a ratio of the rate of advection of a physical quantity by the flow to the rate of diffusion of the same quantity driven by an appropriate gradient. In the context of species or mass transfer, the Péclet number is the product of the Reynolds number (Re) and the Schmidt number (Sc). In the context of thermal fluids, the thermal Péclet number is equivalent to the product of the Reynolds number (Re) and the Prandtl number (Pr). The Péclet number is defined as: Pe=advective transport rate/diffusive transport rate. For mass transfer, it is defined as: $Pe_L = Lu/D = Re_L \cdot Sc$. For heat transfer, it is defined as $PeL = Lu/\alpha = Re_L \cdot Pr$, where $\alpha = k/\rho c_p \cdot L$ is the characteristic length, u the local flow velocity, D the mass diffusion coefficient, and $\alpha$ the thermal diffusivity, $\rho$ the density, and $c_p$ the heat capacity. The static mixer element can be configured to provide higher Péclet values to enhance chaotic advection over diffusion to provide a more uniform residence time distribution and reduce dispersion. In other words, configuration of the static mixer element to provide higher Péclet values can, at least according to some embodiments and examples as described herein, provide improved performance and process control.

In one embodiment, the static mixer element may be configured for operating at a Péclet (Pe) value of at least 100, 1000, 2000, 5000, 10000, 15000, 20000, 25000, 50000, 75000, 100000, 250000, 500000, $10^6$, or $10^7$. The static mixer element may be configured for operating at a Péclet (Pe) value of less than about $10^8$, $10^7$, $10^6$, 500000, 250000, 100000, 75000, 50000, 25000, 20000, 15000, 10000, 5000, 2000, or 1000. The static mixer element may be configured for operating in a Pe range of about $10^3$ to $10^8$, $10^3$ to $10^7$, or $10^4$ to $10^6$. The static mixer element may be configured for operating in a Pe range between any two of the above upper and/or lower values.

The volume displacement % of the continuous flow reactor, or static mixer relative to a reactor chamber for containing the mixer, can be in the range of 1 to 40, 2 to 35, 3 to 30, 4 to 25, 5 to 20, or 10 to 15. The volume displacement % of the continuous flow reactor, or static mixer relative to a reactor chamber for containing the mixer, may be less than 40%, 35%, 30%, 25%, 20%, 15%, 10%, or 5%. In general as the volume displacement of the continuous flow reactor, or of the static mixer relative to the reactor chamber containing the mixer, increases the pressure drop (i.e. pressure differential or back pressure) will also increase. A higher pressure drop increases the design requirement of the continuous reactor system in order to safely accommodate the increased system pressure. Additionally a high volume displacement will also lead to an effective narrowing of the fluidic path within the reactor system. This flow restriction not only is the cause of the above mentioned pressure drop but also may lead to an increase risk of blockage. The amount of reactor tubing required to achieve a given final reactor volume also increases due to the volume occupied by the static mixers.

The configurations of the continuous flow reactor or of the static mixers may be provided to enhance cross-sectional microscopic (CSM) turbulence. Such turbulence may result from various sources, including the geometry of CSM or the microscopic roughness of the CSM surface resulting from the 3D printing process and/or surface coating. For example, turbulent length scales may be reduced to provide better mixing. The turbulent length scales may, for example, be in the range of microscopic length scales.

The configurations of the continuous flow reactor or of the static mixers may be provided to enhance heat transfer properties in the reactor, for example a reduced temperature differential at the exit cross-section. The heat transfer of the CSM may, for example, provide a cross-sectional or transverse temperature profile that has a temperature differential of less than about 20° C./mm, 15° C./mm, 10° C./mm, 9° C./mm, 8° C./mm, 7° C./mm, 6° C./mm, 5° C./mm, 4° C./mm, 3° C./mm, 2° C./mm, or 1° C./mm.

The continuous flow reactor, static mixer or scaffold thereof may be configured such that, in use, the pressure drop across the static mixers (in Pa/m) is in a range of about 0.1 to 1,000,000 Pa/m (or 1 MPa/m), including at any value or range of any values there between. For example, the pressure drop across the continuous flow reactor or static mixer (in Pa/m) may be less than about 500,000, 250,000, 100,000, 50,000, 10,000, 5,000, 1,000, 750, 500, 250, 100, 75, 50, 25, 20, 15, 10, or 5 Pa/m. The continuous flow reactor or static mixers may be configured to provide a lower pressure drop relative to a specific flow rate. In this regard, the static mixers, reactor, system, and processes, as described herein, may be provided with parameters suitable for industrial application. The above pressure drops may be maintained where the volumetric flow rate is at least 0.1, 0.5, 1, 1.5, 2, 2.5, 3, 3.5, 4, 4.5, 5, 6, 7, 8, 9, 10, 20, 30, 40, 50 ml/min.

In one example, the continuous flow chemical reactor is a tubular or plug flow reactor.

In another example, the reactor comprises a heat exchanger for controlling the temperature of the reactor, chamber section, catalytic static mixer, or fluidic components thereof. The heat exchanger may be a shell and tube heat exchanger design or configuration. The shell and tube heat exchanger design can provide for enhanced heat exchange properties.

The aspect ratios of the continuous flow reactor or continuous flow mixer may, for example, be similar to those previously described for the static mixer such that a static mixer element may be configured for insertion into the reactor or mixer.

(E) System

There is also provided a system for carrying out the continuous flow process as described herein. The system comprises a continuous flow reactor for receiving and reacting together an organic stream and an oxidant stream for synthesising a conducting polymer, or any salt thereof. The continuous flow reactor may be provided according to any examples as described herein, such as a continuous flow tubular reactor. The organic stream comprises an organic solvent, a polymerizable organic monomer and a protonic acid. The oxidant stream comprises an aqueous or organic solvent and a free radical initiator. The oxidant and organic streams may be provided according to any of the examples as described herein. The system further comprises one or more pumps for providing fluidic flow for the organic stream, oxidant stream and product stream through the continuous flow reactor.

The system can also comprise a temperature control device for the continuous flow reactor. The temperature control device can be cooperatively associated with the continuous flow reactor. The system may also comprise one or more heat exchangers for controlling the temperature of the streams in the continuous flow reactor to be effective for synthesising the conducting polymer or any salt thereof. The temperature control device can be cooperatively associated with the continuous flow reactor and the one or more heat exchangers for controlling the temperature of the continuous flow reactor, organic stream, emulsion stream, oxidant stream, aqueous stream, and/or product stream.

The system can also comprise a control means for controlling one or more of the parameters of the system selected from concentration, flow rate, temperature, pressure, and residence time, of the one or more streams, fluidic reactants, sources of fluidic reactants, carrier fluids, or products of the reaction.

In one example, there is a system for providing a continuous flow process for controlled synthesis of a conducting polymer or salt thereof, comprising:
 a) a temperature controlled continuous flow reactor comprising at least one mixing element for forming an emulsion;
 b) one or more pumps for providing fluidic flow for any one or more streams passing through the temperature controlled continuous flow reactor;
 c) one or more heat exchangers for controlling the temperature of the temperature controlled continuous flow reactor;
 d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and
 e) a control means for controlling one or more of the parameters of the system selected from concentration, flow rate, temperature, pressure, and residence time, of one or more streams, fluidic reactants, sources of fluidic reactants, fluids, or products of the reaction.

In another example, there is a system for providing a continuous flow process for controlled synthesis of a conducting polymer or salt thereof, comprising:
 a) a temperature controlled continuous flow reactor comprising at least one mixing element for facilitating mixing together of an organic stream and an oxidant stream according to any examples thereof as described herein, at a temperature effective for synthesising a conducting polymer, or any salt thereof, to provide a product stream in the continuous flow reactor comprising the conducting polymer or any salt thereof;
 b) one or more pumps for providing fluidic flow for the organic stream, oxidant stream and product stream through the continuous flow reactor;
 c) one or more heat exchangers for controlling the temperature of the continuous flow reactor, organic stream, oxidant stream, and/or product stream;
 d) a temperature control device cooperatively associated with the continuous flow reactor and the one or more heat exchangers for controlling the temperature of the streams in the continuous flow reactor effective for synthesising the conducting polymer or any salt thereof; and e) a control means for controlling one or more of the parameters of the system selected from concentration, flow rate, temperature, pressure, and residence time, of the one or more streams, fluidic reactants, sources of fluidic reactants, carrier fluids, or products of the reaction.

The temperature controlled continuous flow reactor (e.g. see D, FIG. 3) can comprise at least one mixing element for facilitating mixing together of an organic stream and an oxidant stream. For example, a dynamic or a static mixer. The mixing element may be provided in the continuous flow reactor and/or externally in fluidic communication (e.g. see C, FIG. 3). The mixing element can facilitate formation, maintaining and/or enhancing an emulsion from the emulsion and/or product streams. The operation of the reactor can be provided at a temperature effective for synthesising a conducting polymer, or any salt thereof, to provide a product stream in the continuous flow reactor comprising the conducting polymer or any salt thereof. In one example, the mixer element is configured for use with turbulent flow rates, for example enhancing turbulence and mixing. It will also be appreciated that the mixer element can be configured to enhance the heat and mass transfer characteristics for turbulent flows.

The one or more pumps (e.g. see  FIG. 3) can be used to provide fluidic flow for the organic stream, oxidant stream and product stream through the continuous flow reactor. The pumps may be in line pumps, rotary pumps, centrifugal pumps, or motor driven pumps. In one example, the pumps are in line pumps.

The one or more heat exchangers can be used for controlling the temperature of the continuous flow reactor, organic stream, oxidant stream, and/or product stream (e.g. see F, FIG. 3). The heat exchangers may be plate, shell, tube, or other type effective for controlling the temperature of a continuous flow reactor.

The temperature control device can be cooperatively associated with the continuous flow reactor and the one or more heat exchangers for controlling the temperature of the streams in the continuous flow reactor effective for synthesising the conducting polymer or any salt thereof. The temperature control device can be automated or manual, for example a sensor and computer control option (e.g. G, FIG. 3). The temperature control device may be associated with the control means for the system. The temperature control device can control heating or cooling, for example to maintain a substantially constant temperature.

A control means can be provided for controlling one or more of the parameters of the system selected from concentration, flow rate, temperature, pressure, and residence time, of the one or more streams, fluidic reactants, sources of fluidic reactants, carrier fluids, or products of the reaction. The control means may be manual or automated, such as a computer control option (e.g. see H, FIG. 3, in relation to a control of the pump for A2).

The system may comprise one or more mixing elements for forming or mixing the oxidant stream and organic stream, as individual streams or combined stream. The one or more mixing elements may be static mixers. For example, the system may comprise an organic stream mixing element for mixing together individual or combined source of an organic solvent, a polymerizable organic monomer and a protonic acid.

The system may also comprise a combined stream mixing element for mixing together the organic stream with the oxidant stream to form a combined stream for introducing into the continuous flow reactor.

One or more of the reactor, reactor chamber, chamber section and static mixer, may each be provided in modular form for complimentary association thereof. The system may comprise a plurality of reactors, which may be of similar or different internal and/or external configuration. The reactors may operate in series or in parallel. It will be appreciated that the system, reactor, or each chamber section, may include one or more inlets and outlets to provide supply of reactants, obtain products, or to recirculate various reactants and/or products.

The one or more inlets of the continuous flow reactor (e.g. tubular body of a continuous flow tubular reactor), may be fluidly connected to one or more feed conduits for providing input of any one or more of the streams as described herein (see FIG. 3). The feed conduits may fluidly connect the temperature controlled continuous flow reactor to one or more other continuous flow reactors, such as a continuous flow mixer comprising a mixing element (e.g. tubular reactor comprising a static mixer element). The feed conduits or continuous flow mixers can provide any one or more of the streams as described herein being mixed at or proximate to the one or more inlets of the temperature controlled continuous flow reactor. In one example, the feed conduit is a tubular reactor, which may further comprise a static mixer.

In one example, the system further includes a continuous flow mixer (e.g. Mixer 1) for forming the organic stream, wherein the continuous flow mixer optionally comprises at least one mixing element and is in fluidic connection with the temperature controlled continuous flow reactor. In another example, the system further includes a continuous flow mixer (e.g. Mixer 2) for forming the product stream, wherein the continuous flow mixer optionally comprises at least one mixing element and is in fluidic connection with the temperature controlled continuous flow reactor.

In another example, the system further includes a first continuous flow mixer (e.g. Mixer 1) for forming the organic stream that is in fluidic connection with a second continuous flow mixer (e.g. Mixer 2) for forming the product stream, wherein the first and second continuous flow mixers each optionally comprise at least one mixing element, and wherein the second continuous flow mixer is in fluidic connection with the temperature controlled continuous flow reactor.

It will be appreciated that one or more additional continuous flow mixers may be included in the system. It will also be appreciated that the temperature controlled continuous flow reactor may comprise at least one static mixer, and may for example comprise additional static mixer elements. The additional static mixer elements may be connected together as one or more repeating units or modules. In some examples, one or more static mixer elements may occupy a length along the reactor (% of total reactor length) of at least about 50, 55, 60, 65, 70, 75, 80, or 85.

The continuous flow mixers, such as the above mentioned first and second continuous flow mixers, may comprise one or more static mixer elements. In one example, the continuous flow mixer may be a tubular conduit (e.g. about 30 cm in length) comprising one or more static mixer elements (e.g. each about 15 cm in length), for example two static mixer elements in connection within the tubular conduit. In other examples, the continuous flow mixers are continuous flow static mixers comprising one or more static mixer elements (e.g. up to about 15 static mixer elements).

In one example, there is a system for providing a continuous flow process for controlled synthesis of a conducting polymer or salt thereof, comprising:
- a) a temperature controlled continuous flow reactor comprising at least one static mixer element for use in mixing together an organic stream and an oxidant stream into an emulsion and to form a product stream in flow within the reactor comprising the conducting polymer or salt thereof;
- b) one or more pumps for providing fluidic flow for any one or more streams passing through the temperature controlled continuous flow reactor;
- c) one or more heat exchangers for controlling the temperature of the temperature controlled continuous flow reactor;
- d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and
- e) a control means for controlling one or more of the parameters of the system selected from concentration, flow rate, temperature, pressure, and residence time, of one or more streams, fluidic reactants, sources of fluidic reactants, fluids, or products of the reaction.

In another example, there is a system for providing a continuous flow process for controlled synthesis of a conducting polymer or salt thereof, comprising:
- a1) a first continuous flow reactor comprising at least one static mixer element for use in mixing together an optionally cooled organic stream and an optionally cooled oxidant stream to form an emulsion stream;
- a2) a second temperature controlled continuous flow reactor in fluidic communication with the first continuous flow reactor, the second temperature controlled continuous flow reactor comprising at least one static mixer element for use in forming a product stream comprising the conducting polymer or salt thereof from the emulsion stream in flow within the reactor;
- b) one or more pumps for providing fluidic flow for any one or more streams passing through the temperature controlled continuous flow reactor;
- c) one or more heat exchangers for controlling the temperature of the temperature controlled continuous flow reactor;
- d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and
- e) a control means for controlling one or more of the parameters of the system selected from concentration, flow rate, temperature, pressure, and residence time, of one or more streams, fluidic reactants, sources of fluidic reactants, fluids, or products of the reaction.

In another example, there is a system for providing a continuous flow process for controlled synthesis of a conducting polymer or salt thereof, comprising:
- a1) a first continuous flow reactor comprising at least one static mixer element for use in mixing together a protonic acid stream and organic monomer stream to form an organic stream;
- a2) a second continuous flow reactor in fluidic communication with the first continuous flow reactor, the second continuous flow reactor comprising at least one static mixer element for use in mixing together the organic stream and an optionally cooled oxidant stream to form an emulsion stream;
- a3) a third continuous flow reactor in fluidic communication with the second continuous flow reactor, the third continuous flow reactor being temperature controlled and comprising at least one static mixer element for use in forming a product stream comprising the conducting polymer or salt thereof from the emulsion stream in flow within the reactor;
- b) one or more pumps for providing fluidic flow for any one or more streams passing through the temperature controlled continuous flow reactor;
- c) one or more heat exchangers for controlling the temperature of the temperature controlled continuous flow reactor;
- d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and
- e) a control means for controlling one or more of the parameters of the system selected from concentration, flow rate, temperature, pressure, and residence time, of one or more streams, fluidic reactants, sources of fluidic reactants, fluids, or products of the reaction.

(F) Post Addition of Secondary Dopants

After the chemical synthesis reaction is complete and the conducting polymer has been synthesised in the continuous flow reactor, one or more additional additives such as secondary dopants and/or reagents may be added at this point to enhance properties such as thermal stability, conductivity, solubility and compatibility with other polymers. The additional additives, namely secondary dopants, may include sulfonyl diphenol, meta-cresol, thymol, polyols and plasticizers. For example, following step c) or step d) of the continuous flow process as described according to any examples herein, an additive selected from the group consisting of a secondary dopant and additional reagent, can be contacted, mixed or processed with the conducting polymer or salt thereof.

(G) Collection and Further Processing

A further purification process of the product obtained from the continuous flow process may comprise mixing collected product stream with an organic solvent to form a biphasic mixture comprising an organic phase and an aqueous phase, separating the aqueous phase from the organic phase, and obtaining a product from the organic phase.

A solvent such as acetone may be added to the organic phase to precipitate the conducting polymer, for example PANI-DNNSA can be precipitated as a fine green powder. For PANI-DNNSA, this can be collected by filtration and washed thoroughly with acetone before drying to give PANI-DNNSA, for example in yields of at least about 50, 60, 70, 80, or 90%.

From a small portion of the PANI-DNNSA a concentrate, for example a 70% w/v solution, can be made up in toluene and a thin film cast. After drying overnight in the oven, for example at 100° C., the film can be washed (e.g. with propanol) and allowed to air dry. The resulting thin film may be provide with a thickness of 5 to 20 µm (e.g. 8 µm). A film of 8.25 µm PANI-DNNSA was found produced by the process was found to have a conductivity of 10.6 S/cm.

(H) Conducting Polymers and Materials Thereof

The conductive polymers may be used in compositions, formulations, coatings such as dissipative coatings, and materials such as composites. The conducting polymers may be used in or with epoxy resins to provide epoxy resin based coatings, for example. The conductive polymers may be used in coatings on external aircraft panels, for example.

In one example, the conducting polymers, such as conducting polymer salts are organic soluble conducting polymers. For example, the conducting polymers prepared from the process can be an organic soluble polyaniline salt, such as PANI-DNNSA.

As previously described, the PANI-DNNSA was obtained following processing as a fine green powder. A PANI-DNNSA concentrate of 70% w/v solution in toluene was thin film cast with a thickness of 8.25 μm and a conductivity of 10.6 S/cm.

Many modifications of examples set forth herein will come to mind to one skilled in the art to which the present disclosure pertains having the benefit of the teachings presented in the foregoing descriptions and the associated drawings and figures. Therefore, it is to be understood that the present disclosure is not to be limited to the specific examples illustrated and that modifications and other examples are intended to be included within the scope of the appended claims. Moreover, although the foregoing description and the associated drawings and figures describe examples of the present disclosure in the context of certain illustrative combinations of elements and/or functions, it should be appreciated that different combinations of elements and/or functions may be provided by alternative implementations without departing from the scope of the appended claims.

Further examples of the present disclosure are provided by any one of the following clauses:

Clause 1. A continuous flow process for controlled synthesis of a conducting polymer or salt thereof, comprising providing an emulsion of a polymerizable organic monomer, a protonic acid and a free radical initiator in a temperature controlled continuous flow reactor comprising at least one mixing element, at a temperature effective for synthesising the conducting polymer or salt thereof to provide a product stream comprising the conducting polymer or salt thereof.

Clause 2. The continuous flow process of Clause 1, further comprising obtaining the conducting polymer or salt thereof from the product stream under continuous flow conditions.

Clause 3. The continuous flow process of Clause 1 or Clause 2, wherein the polymerizable organic monomer is introduced as a neat organic solution optionally comprising one or more solvents.

Clause 4. The continuous flow process of any one of Clauses 1 to 3, comprising:
a) providing a polymerizable organic monomer and a protonic acid in an organic stream comprising an organic solvent;
b) providing a free radical initiator in an oxidant stream comprising an aqueous or organic solvent; and
c) mixing the organic stream and oxidant stream in a temperature controlled continuous flow reactor comprising at least one mixing element, at a temperature effective for synthesising the conducting polymer or salt thereof to provide a product stream in the temperature controlled continuous flow comprising the conducting polymer or salt thereof; and
d) obtaining the conducting polymer or salt thereof from the product stream under continuous flow conditions, after the product stream has exited the temperature controlled continuous flow reactor.

Clause 5. The continuous flow process of any one of Clauses 1 to 4, wherein the temperature controlled continuous flow reactor is a temperature controlled continuous flow tubular reactor.

Clause 6. The continuous flow process of any one of Clauses 1 to 5, wherein the conducting polymer is selected from the group consisting of a polyarylamine, polyarylthiol, polypyrrole, polycarbazole, polyindole, polyazepine, polythiophene, poly(3,4-ethylenedioxythiophene), poly(3,4-propylenedioxythiophene), or any salt thereof, and the polymerizable organic monomer is selected from the group consisting of an arylamine, arylthiol, pyrrole, carbazole, indole, azepine, thiophene, 3,4-ethylenedioxythiophene, 3,4-propylenedioxythiophene monomer, or any salt thereof, and wherein each conducting polymer and polymerizable organic monomer is unsubstituted or substituted.

Clause 7. The continuous flow process of Clause 6, wherein the conducting polymer is polyaniline and the polymerizable organic monomer is an unsubstituted or substituted aniline, the conducting polymer is poly(3,4-ethylenedioxythiophene) and the polymerizable organic monomer is an unsubstituted or substituted 3,4-ethylenedioxythiophene, or the conducting polymer is poly(3,4-propylenedioxythiophene) and the polymerizable organic monomer is an unsubstituted or substituted 3,4-propylenedioxythiophene monomer.

Clause 8. The continuous flow process of any one of Clauses 1 to 7, wherein each individual polymerised chain of the conducting polymer is independently comprised of individual monomer units of between about 100 to 1500.

Clause 9. The continuous flow process of any one of Clauses 1 to 8, wherein the conducting polymer has a weight average molecular weight of between 10,000 and 120,000.

Clause 10. The continuous flow process of any one of Clauses 1 to 9, wherein for step c) the temperature of the mixed streams is set between about −5 to 5° C. and maintained across an axial flow length of the continuous flow reactor, allowing a variation of 1-2 degrees Celsius or less.

Clause 11. The continuous flow process of any one of Clauses 1 to 10 for controlled synthesis of polyaniline or salt thereof, comprising the steps of:
a) providing an unsubstituted or substituted aniline or salt thereof and a protonic acid in an organic stream comprising an organic solvent;
b) providing a free radical initiator in an oxidant stream comprising an aqueous or organic solvent; and
c) mixing the organic stream and oxidant stream in a temperature controlled continuous flow reactor comprising at least one mixing element at a temperature effective for synthesising polyaniline or salt thereof to provide a product stream in the temperature controlled continuous flow reactor comprising polyaniline or salt thereof; and
d) obtaining polyaniline or salt thereof from the product stream under continuous flow conditions, after the product stream has exited the temperature controlled continuous flow reactor.

Clause 12. The continuous flow process of any one of Clauses 1 to 11, wherein the free radical initiator is an oxidising agent, for example ammonium persulfate.

Clause 13. The continuous flow process of any one of Clauses 1 to 12, wherein for step b) the oxidant stream is an aqueous stream comprising an aqueous solvent, and the mixing together of an organic stream and aqueous stream in a continuous flow in step c) provides a product stream in the form of an emulsion.

Clause 14. The continuous flow process of any one of Clauses 1 to 13, wherein for step (a) the organic stream is a non-aqueous organic solution comprising the organic solvent, polymerizable organic monomer and a protonic acid.

Clause 15. The continuous flow process of any one of Clauses 1 to 14, wherein the mixing element in the temperature controlled continuous flow reactor of step (c) is at least one of a static mixer and dynamic mixer.

Clause 16. The continuous flow process of any one of Clauses 1 to 15, wherein the oxidant stream and aqueous stream are premixed under continuous flow conditions before introducing into the temperature controlled continuous flow reactor of step (c).

Clause 17. The continuous flow process of any one of Clauses 1 to 16, wherein the organic stream is provided by:
 a1) providing a protonic acid stream comprising an organic solvent and a protonic acid;
 a2) providing a monomer stream comprising a polymerizable organic monomer and optionally an organic solvent; and
 a3) mixing together the protonic acid stream and monomer stream to form the organic stream for step (a).

Clause 18. The continuous flow process of Clause 17, wherein for step a2) the polymerizable organic monomer is provided as a neat organic solution optionally comprising one or more solvents.

Clause 19. The continuous flow process of Clause 17 or Clause 18, wherein the monomer stream is an aniline stream comprising an unsubstituted or substituted aniline and optionally an organic solvent; and step a3) provides mixing together the protonic acid stream and aniline stream to form the organic stream in step (a).

Clause 20. The continuous flow process of any one of Clauses 17 to 19, wherein the protonic acid stream and monomer stream are premixed under continuous flow conditions before mixing with the oxidant stream.

Clause 21. The continuous flow process of any one of Clauses 1 to 20, wherein the mixing of the streams is provided by one or more static mixers under continuous flow conditions.

Clause 22. The continuous flow process of any one of Clauses 1 to 21, comprising:
 a) providing an unsubstituted or substituted aniline or salt thereof, and a protonic acid, in an organic stream comprising an organic solvent;
 b) providing an oxidising agent in an aqueous stream comprising an aqueous solvent;
 c) mixing the organic stream and oxidant stream in a temperature controlled continuous flow tubular reactor comprising at least one mixing element, at a temperature effective for synthesising polyaniline or salt thereof to provide a product stream in the temperature controlled continuous flow tubular reactor comprising the conducting polymer of polyaniline or salt thereof; and
 d) obtaining the conducting polymer of polyaniline or salt thereof from the product stream under continuous flow conditions, after the product stream has exited the temperature controlled continuous flow tubular reactor.

Clause 23. The continuous flow process of Clause 22, wherein the polymerizable organic monomer is an unsubstituted aniline.

Clause 24. The continuous flow process of Clause 22 or Clause 23, wherein the protonic acid is dinonylnapthalenesulfonic acid (DNNSA).

Clause 25. The continuous flow process of any one of Clauses 22 to 24, wherein the organic solvent is selected from the group consisting of aromatic hydrocarbon, aliphatic hydrocarbon, glycols, ethers, glycol ethers, and mixtures thereof.

Clause 26. The continuous flow process of Clause 25, wherein the organic solvent is an aromatic hydrocarbon.

Clause 27. The continuous flow process of any one of Clauses 1 to 26, wherein the free radical initiator is an oxidising agent selected from the group consisting of persulfates, peroxides, dichromates, cerium (IV) salts, and mixtures thereof.

Clause 28. The continuous flow process of Clause 27, wherein the oxidising agent is ammonium persulfate.

Clause 29. The continuous flow process of any one Clauses 1 to 28, wherein the concentration of the aniline in the organic stream is from about 0.1 M to about 0.8 M.

Clause 30 The continuous flow process of Clause 29, wherein the concentration of the aniline in the organic stream is from about 0.2 M to about 0.5 M.

Clause 31. The continuous flow process of any one of Clauses 1 to 30, wherein the continuous flow reactor is a continuous flow tubular reactor and the internal diameter of the tubular reactor is at least about 2 mm, for example about 2 to 20 mm or 5 to 10 mm.

Clause 32. The continuous flow process of any one of Clauses 1 to 31, wherein the process provides at least about 50 g of conducting polymer per hour of operation.

Clause 33. The continuous flow process of Clause 32, wherein the operation performance is with respect to a continuous flow reactor volume of about 100 to 3000 ml.

Clause 34. The continuous flow process of any one of Clauses 1 to 33, wherein following step c) or step d) an additive selected from the group consisting of a secondary dopant and additional reagent, is contacted with the conducting polymer or salt thereof.

Clause 35. The continuous flow process of any one of Clauses 1 to 34, wherein the process provides at least about 100 g of conducting polymer per hour of operation per litre of internal volume of the continuous flow reactor.

Clause 36. A conducting polymer prepared by the continuous flow process according to any one of Clauses 1 to 35.

Clause 37. A composition, coating or material comprising the conducting polymer or salt thereof of Clause 36.

Clause 38. A system for providing a continuous flow process for controlled synthesis of a conducting polymer or salt thereof, comprising:
 a) a temperature controlled continuous flow reactor comprising at least one mixing element for facilitating mixing together of an organic stream and an oxidant stream according to any examples thereof as described herein, at a temperature effective for synthesising a conducting polymer, or any salt thereof, to provide a product stream in the temperature controlled continuous flow reactor comprising the conducting polymer or any salt thereof;
 b) one or more pumps for providing fluidic flow for the organic stream, oxidant stream and product stream through the temperature controlled continuous flow reactor;
 c) one or more heat exchangers for controlling the temperature of the temperature controlled continuous flow reactor, organic stream, oxidant stream, and/or product stream;
 d) a temperature control device cooperatively associated with the temperature controlled continuous flow reactor and the one or more heat exchangers for controlling the temperature of the streams in the temperature controlled continuous flow reactor effective for synthesising the conducting polymer or any salt thereof; and e) a control means for controlling one or more of the parameters of the system selected from concentration, flow rate, temperature, pressure, and residence time, of the one or more streams, fluidic reactants, sources of fluidic reactants, carrier fluids, or products of the reaction.

EXAMPLES

The present disclosure is further described by the following examples. It is to be understood that the following description is for the purpose of describing particular examples only and is not intended to be limiting with respect to the above description.

Continuous Flow Process

A continuous flow process for controlled synthesis of polyaniline according to one aspect of the present invention is provided by way of example in FIG. 3. The continuous flow process reactor 1 comprises mixing an unsubstituted or substituted aniline stream A1, a protonic acid stream A2, and an organic solvent (not shown), thereby forming an organic stream A3. The organic stream A3 may be formed via mixing using a static mixer or any other mixing element (e.g. static mixer or dynamic mixer within D and/or an external mixing element such as can be provided in C). The organic stream A3 is then mixed with an oxidant stream B which comprises an oxidising agent to form a product stream C for synthesising polyaniline. The product stream C may be formed by mixing using a static mixer or any other mixing element (e.g. dynamic mixer). The product stream C is then introduced into a temperature controlled flow reactor D for facilitating controlled synthesis of polyaniline. The temperature controlled flow reaction D may optionally comprise one or more static mixers to facilitate the mixing of the product stream C. The product from the control flow reactor D containing the polyaniline product is then collected at E and optionally further processed.

Materials and Analysis

All reagents and solvents were used without further purification. Aniline (99.5%) and ammonium persulfate (98.5%) were obtained from Sigma Aldrich, DNNSA (50% w/w in 2-butoxyethanol) was obtained from King Industries and toluene from Merck. Molecular weight data were collected by Advanced Polymer Chromatography (APC) using a Waters ACQUITY system. Run on two APC XT columns; XT200 (linear range 3 k to 70K) and XT450 (linear range 20K to 400K). Columns use solid beads (trimethyl silane bonded to Ethylene Bridged Hybrid (BEH) substrate). Flow rate 0.7 ml/min at 50° C. RID calibrated with freshly prepared PS standards. N-methylpyrolidone (Acros Organics) modified with 20 mM ammonium formate (Sigma-Aldrich) was used as both the mobile phase and polymer solvent. Thin films were prepared by spin coating onto square cut, glass slides from PANI-DNNSA solutions made up in xylene or toluene (50-75% w/v, 2000 RPM, 40 sec). The resulting films were dried in the oven overnight at 100° C. prior to surface treatments being applied. Resistance measurements were recorded using a Jandel RM3000 four point probe averaging across 3 readings. Film thickness was determined using a Veeco Dektak 6M Profilometer averaging across 3 surface scratches. UV/Vis spectra were prepared in xylene or toluene and recorded using an HP/Agilent 8453 UV/Vis Spectrophotometer with Chemstation software. $^1$H-NMR spectra were recorded on an AC-400 spectrometer (Bruker) in deuterated water or CDCl$_3$ (Cambridge Isotope Laboratories). The residual solvent peak at δ=7.26 ppm was used as an internal reference.

Example 1: Continuous Controlled Flow Process

The configuration of the continuous controlled flow process for the synthesis of PANI consists of two stages. The first stage provides room temperature mixing of the aniline reagents and protonic acid (A1 and A2, FIG. 3) to form an organic stream A3 before this combined organic stream A3 is mixed with the oxidant stream from B generating an emulsion product stream C in the pressurised zone. This emulsion C is then fed into a temperature controlled flow reactor D, downstream of the pressurised zone, where the reaction was allowed to progress with active temperature control and reaction monitoring.

Stage 1: Reagent delivery was achieved using a three pump configuration (see  in FIG. 3). Pump P-1 was used to deliver the aniline solution A1, pump P-2 used to deliver DNNSA solution A2 and pump P-3 was used to deliver the ammonium persulfate solution A3. Both aniline and DNNSA are delivered with a Knauer Pump 80P (pumps (P-1 and P-2) capable of operating at flow rates up to 100 mL/min and pressures up to 400 bar. Pump P-3 is a SSI PR-Class Dual Piston Positive Displacement Pump capable of delivering flow rates up to 100 mL/min and pressures of 276 bar. The reagent streams are transferred using PFA tubing (⅛" OD, ¹⁄₁₆" ID) obtained from VICI and mixed in a SS Swagelok T-piece. Following this initial mixing the reagents are then passed through SM-1 a 15 cm SS tube (³⁄₁₆" OD, 3.4 mm ID) fitted with PP high shear static mixers (Cambridge Reactor Design). The solution of aniline and DNNSA is then combined with the APS solution from P-3 and passed through SM-2 a 30 cm SS tube (³⁄₁₆" OD, 3.4 mm ID) fitted with PP high shear static mixers (Cambridge Reactor Design). A Swagelok R3A-A relief valve was used in order to pressurise Stage 1 which can be adjusted to give system pressures ranging from 3.4 to 24.1 bar. All other plumbing of reactor lines was carried out using standard Swagelok fittings.

Stage 2: The 1 L shell-and-tube continuous reactor (Cambridge Reactor Design) consists of a series of Hastelloy C276 alloy tubes (8 mm OD, 6 mm ID) connected in a serpentine fashion within the reactor shell. The reactor is fitted with static mixers along its length and has a total internal volume of 1 L. Depending on the ancillary equipment used the reactor can operate over a temperature range of −10° C. to 200° C. up to pressures of 25 bar. For the purposes of the current experiments reactor temperature control is provided by a Julabo Presto A40 thermostat capable of operating from −40° C. to 250° C. Monitoring of the internal reactor tube temperature was performed using 4 PT-100 temperature probes connected to position 1, 8, 15 and 24 of the 5×5 array recorded using a OM-DAQPRO-5300 portable data acquisition and logging system. No back pressure regulator (BPR) was used for this section of the reactor.

Example 2: Preparation of PANI-DNNSA Comparative Batch Synthesis

The general procedure for the preparation of polyaniline dinonylnathalenesulfonic acid (PANI-DNNSA) using batch synthesis is provided below in Scheme 1:

Scheme 1

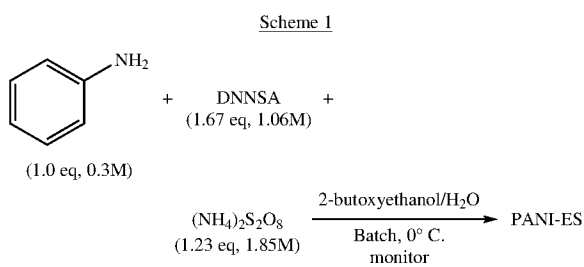

Aniline (3.88 mL, 42.6 mmol) was added to deionized water (141 mL) and the resulting (0.3 M) solution cooled to 0° C. in a thermostatic bath. DNNSA (67 mL, 50% w/w in 2-butoxyethanol) was then added with mechanical stirring to form a white emulsion. A solution of ammonium persulfate in water (28 mL, 1.85 M) was then added dropwise, maintaining the internal reaction temperature at 0° C. The resulting brown mixture was stirred for 20 h at 0° C. monitoring the internal reaction temperature. During this time the emulsion separated into a green organic phase and a colorless aqueous phase. The biphasic, product mixture was then washed into a separation funnel with xylene (50 mL) and the aqueous layer drained off. The organics were then washed with water (5×100 mL) and the solvent evaporated under vacuum to give highly concentrated PANI-DNNSA in the remaining solvent. Addition of acetone to the concentrate resulted in the precipitation of PANI-DNNSA as a fine green powder. This was collected by filtration and washed thoroughly with acetone before drying to give PANI-DNNSA (12.0425 g) in 88 wt % yield.

From a small portion of the PANI-DNNSA concentrate a 70% w/v solution was made up in xylene and a thin film cast. After drying overnight in the oven at 100° C. the film was washed with 2-propanol and allowed to air dry. The resulting thin film had a thickness of 4.12 μm and a conductivity of 31 S/cm.

Example 3: Preparation of PANI-DNNSA Using Continuous Flow Process

The 1 L reactor system was cooled to 0° C. before aniline (1.0 eq, neat, 99.5%) A1 was pumped (P-1) at 0.56 ml/min and a DNNSA (1.5 eq, 50% w/w in 2-butoxyethanol) A2 was pumped at 8.71 ml/min (P-2) through static mixer 1 (SM-1) for 1 minute to form an organic stream A3. Ammonium persulfate (1.2 eq, 1.0 M solution in $H_2O$) B was then introduced at 7.4 ml/min (P-3). The combined reagent stream was then directed through static mixer 2 (SM-2) in order to form an emulsion product stream C which then enters the pre-cooled 1 L Salamander Jacketed Flow Reactor with a combined flow rate of 16.67 ml/min in order to give a total residence time of 1 h. Collection of the steady state product at E was begun after 1 h 16 min. After completion of the steady state operation, P-3 was switched to a water wash followed by switching P-1 and P-2 to toluene. Collection was stopped after 3 h 28 min and the crude product solution diluted with toluene (2.45 L). The aqueous layer was then drained off and the organics washed with 0.1 M $H_2SO_4$ (3×1.25 L) followed by $H_2O$ (3×1.25 L). The washed organics were then concentrated under reduced pressure and toluene (2.25 L) re-added in order to further dry the organics azeotropically. This drying process was repeated once more before re-adding toluene once more in order to bring the solution back up to the desired concentration (50% w/w).

Addition of acetone to the concentrate resulted in the precipitation of PANI-DNNSA as a fine green powder. This was collected by filtration and washed thoroughly with acetone before drying to give PANI-DNNSA (230.7530 g) in 88 wt % yield.

From a small portion of the PANI-DNNSA concentrate a 70% w/v solution was made up in toluene and a thin film cast. After drying overnight in the oven at 100° C. the film was washed with 2-propanol and allowed to air dry. The resulting thin film had a thickness of 8.25 μm and a conductivity of 10.6 S/cm.

Example 4: Continuous Flow Reactions

A continuous flow reaction performed under the same experimental conditions is shown in Table 1:

TABLE 1

| Type | Exoth. ΔT (° C.) | Yield (wt %) | Throughput (g/h) | S.T.Y (g/Lh) | MP (g/mol) | Mn (g/mol) | Conductivity (S/cm) |
|---|---|---|---|---|---|---|---|
| Cont. Flow | <0.6 | 85 | 88 | 101 | 48550 | 34716 | 11.1 |

Table 1 shows that the continuous flow process using a different arrangement of monomer and protonic acid in an organic solvent stream can surprisingly obtain advantageous MP, Mn and conductivity values while allowing for a substantially higher output than that of a batch process.

It will be appreciated that space time yield (S.T.Y.) is a measure of the efficiency of a reactor system. It is defined as the amount of product produced over a given time frame per unit volume of the reactor vessel. It provides a useful value for comparing the efficiency of processes carried out in batch and continuous systems.

Space time yield (S.T.Y.) of a chemical reactor can be calculated based on the amount of product, $m_p$, using the equation below. This equation allows for easy comparison of the efficiency of batch and flow reactors.

$$S.T.Y. = \frac{m_p \cdot \dot{V}}{V_R \cdot V_{SS}} = \frac{m_p}{t_R \cdot V_R}$$

When calculating the space-time-yield in a continuous scenario, $\dot{V}$ is the total volumetric flow rate through the reactor, $V_{SS}$ the combined volume of both stock solutions and $V_R$ the volume of the flow reactor. The equivalent calculation can be performed for batch reactors where $t_R$ is the total processing time and $V_R$ is the volume of the batch reaction vessel.

Molecular Weight Range

Mn=30,000-100,000 g/mol is a range with the flow process generally producing PANI-DNNSA with MP=44,000 g/mol, Mn=34,000 g/mol, Mw=53,000 g/mol and a polydispersity (Pd)=1.57.

Figure 5:
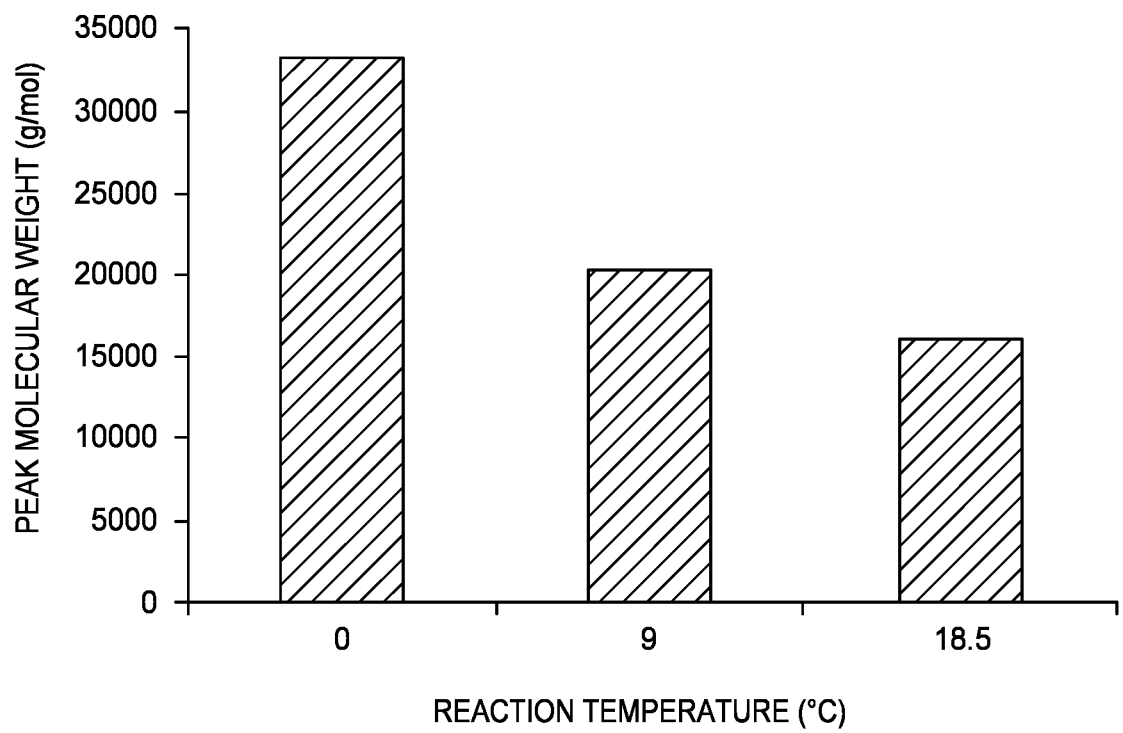
FIG. 5 is a reaction temperature profile versus peak molecular weight for a continuous flow process according to one example of the present disclosure.
Figure 6:
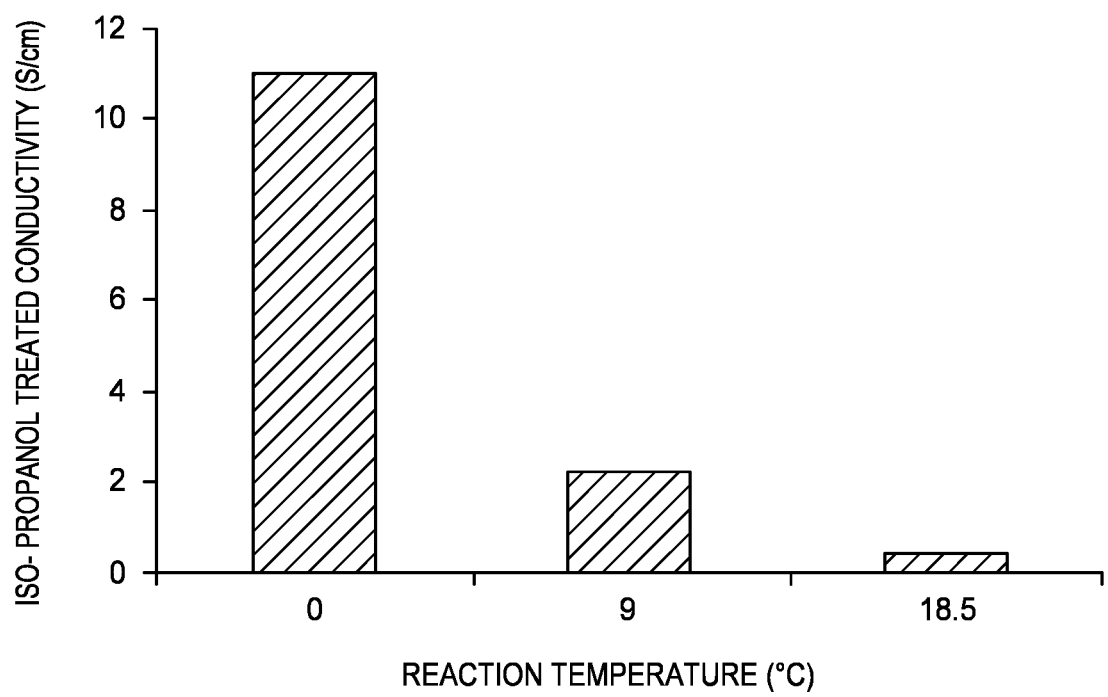
FIG. 6 is a reaction temperature profile versus iso-propanol conductivity for a continuous flow process according to one example of the present disclosure.
Figure 7:
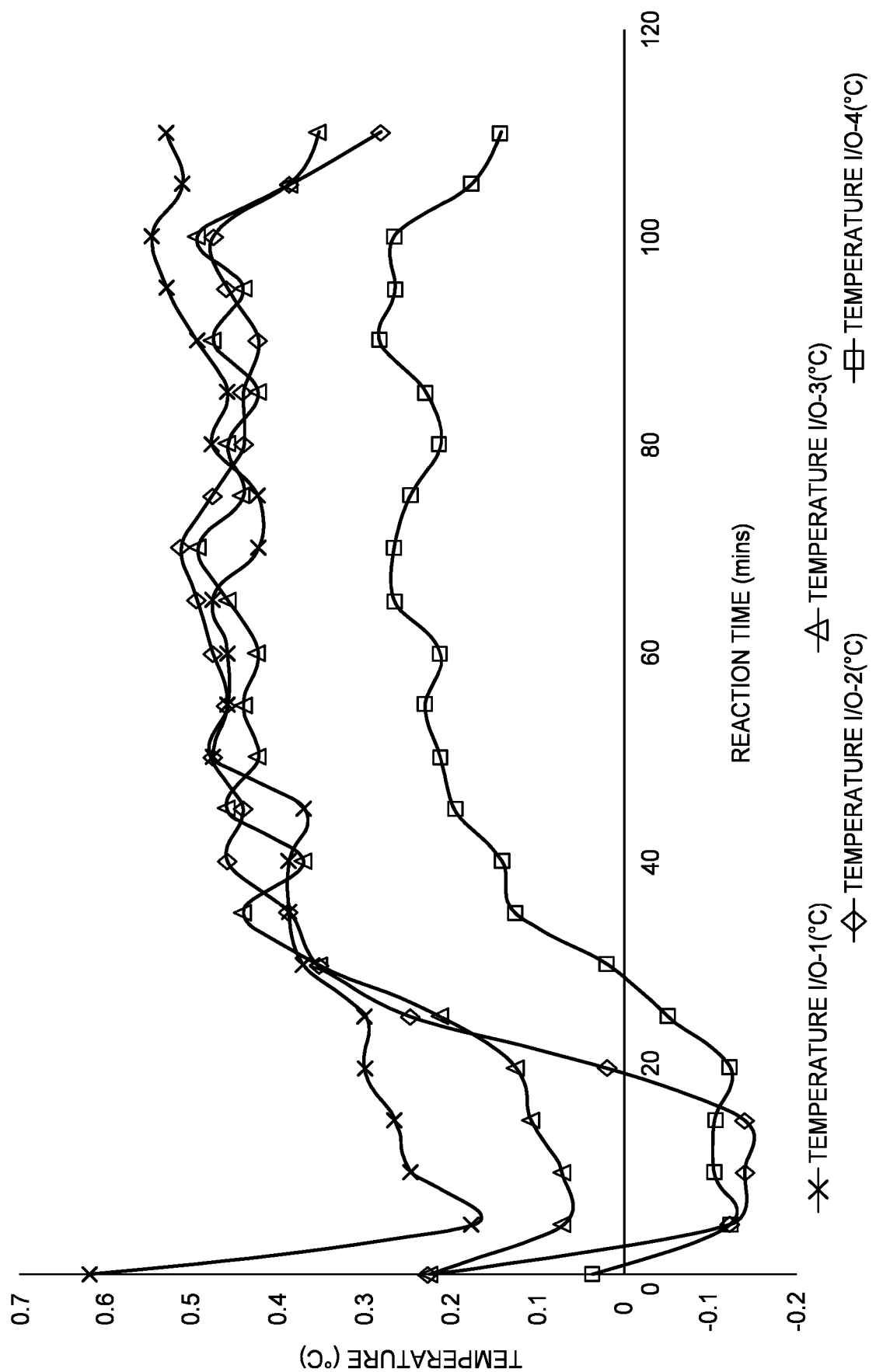
FIG. 7 is a reaction temperature profile for various continuous flow process according to some examples of the present disclosure.

Flow experiments in the continuous reactor show <0.6° C. variation during the steady state portion of the reaction (see above Table 1 Code 391-150, and FIG. 5). Excellent temperature control was achieved in all experiments using the cooled shell-and-tube reactor system here showing a ΔT of 0.6° C.

Example 5: Effect of Temperature on Product Quality in Flow

Three different temperatures were initially explored in flow (0, 9.0 and 18.5° C.). Using the 100 ml flow reactor so mixing is not optimal. Yields have improved further with scale-up and higher flow rates leading to better mixing in the 1 L flow reactor. The results are shown in Table 2:

TABLE 2

| Code | Conditions | | | Yield | Conductivity |
| --- | --- | --- | --- | --- | --- |
| | Temp. (° C.) | ΔT (° C.) | $T_{PROCESSING}$ (mins) | PANI-ES (% w/w) | (S/cm) Iso-propanol |
| 391-048 | 18.5 | 0.5 | 30 | 45 | 4.32E−01 |
| 391-049 | 9.0 | 0.4 | 30 | 46 | 2.22E+00 |
| 391-050 | 0.0 | 0.6 | 30 | 59 | 1.10E+01 |

It can be appreciated that as reaction temperature is decreased, the yield of PANI-DNNSA increases (391-048 to 391-050), and this comparison of yield and reaction temperature is exemplified in FIG. 2.

It can also be appreciated that as reaction temperature is decreased, the molecular weight of PANI-DNNSA increases (391-048 to 391-050), and this comparison of peak molecular weight is exemplified in FIG. 3.

Figure 4:
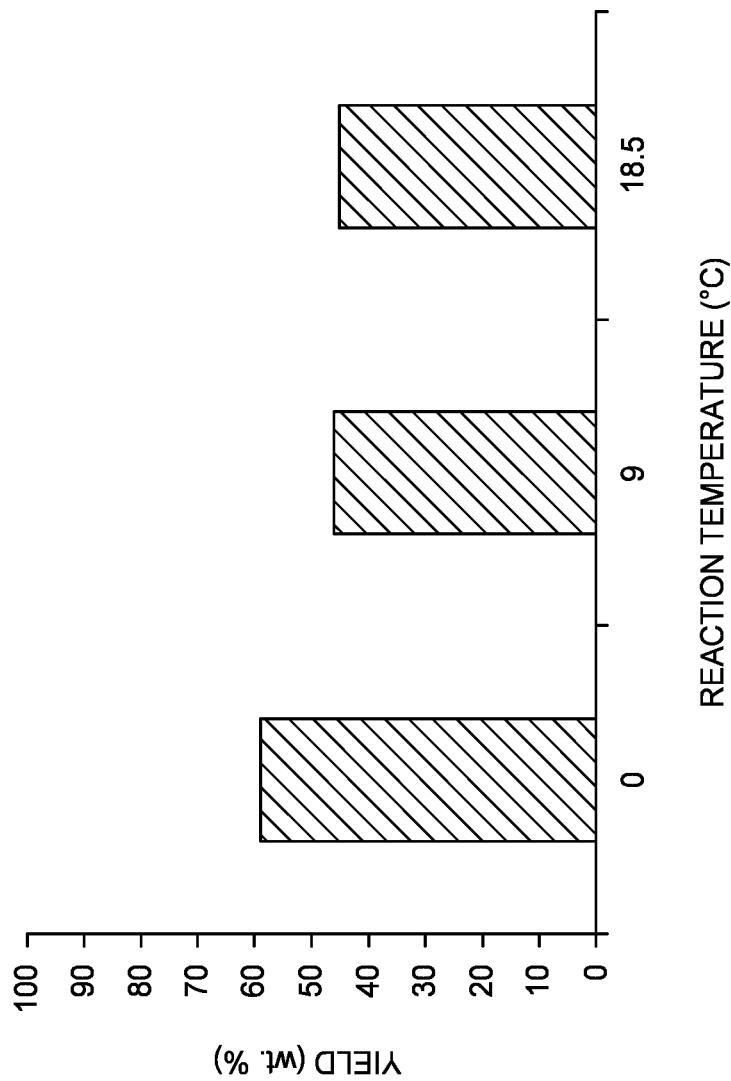
FIG. 4 is a reaction temperature profile versus yield for a continuous flow process according to one example of the present disclosure.

It is also appreciated that as reaction temperature is decreased, the conductivity of the PANI-DNNSA increases (391-048 to 391-050), and this comparison of thin film conductivity following i-PrOH treatment after reaction at different temperatures is exemplified in FIG. 4. Iso-propanol treatment is used to enhance the conductivity of the polymer film. In practise any organic solvent capable of removing the excess protonic acid (e.g. DNNSA in this case) may be used. An example iso-propanol treatment procedure is as follows. From a small portion of the PANI-DNNSA concentrate a 70% w/v solution was made up in toluene and a thin film cast. After drying overnight in the oven at 100° C. the film was washed with i-PrOH and allowed to air dry. The thickness and resistance of the resulting thin film were then measured from which the conductivity could be determined.

As shown above, a lower reaction temperature, such as from about −5° C. to about +5° C. can provide a PANI-DNNSA product according to at least some examples as described herein having further advantageous properties, for example conductivity (10-20 S/cm), yield (70-90 wt %), and Mw (defined as MP 30,000 to 100,000 g/mol).

The invention claimed is:

1. A system for providing a continuous flow process for controlled synthesis of a conducting polymer or salt thereof, comprising:
a temperature controlled continuous flow reactor comprising at least one mixing element, an organic stream, an oxidant stream, and a product stream comprising a conducting polymer, wherein the temperature controlled continuous flow reactor comprises a temperature effective for synthesizing the conducting polymer, or salt thereof in the product stream;
one or more pumps;
one or more heat exchangers;
a temperature control device cooperatively associated with the temperature controlled continuous flow reactor and the one or more heat exchangers; and
a control means to control one or more of a concentration, a flow rate, a temperature, a pressure, and a residence time, of the one or more streams, fluidic reactants, sources of fluidic reactants, carrier fluids, or products of the reaction.

2. The system of claim 1, wherein the mixing element comprises a static mixer or a dynamic mixer.

3. The system of claim 1, wherein the pumps are one or more of line pumps, rotary pumps, centrifugal pumps, or motor driven pumps.

4. The system of claim 3, wherein the pump is a line pump.

5. The system of claim 1, wherein the pump provides fluidic flow for the organic stream, the oxidant stream, and the product stream.

6. The system of claim 1, wherein heat exchanger is a shell and tube heat exchanger.

7. The system of claim 1, wherein the heat exchanger controls the temperature of the temperature controlled continuous flow reactor, organic stream, oxidant stream, and/or product stream.

8. The system of claim 1, wherein the temperature control device is automated or manual.

9. The system of claim 8, wherein the temperature control device is automated and comprises a sensor.

10. The system of claim 8, wherein the temperature control device is manual and comprises a computer control option.

11. The system of claim 1, wherein the temperature control device controls the temperature of the organic stream, the oxidant stream, and the product stream in the temperature controlled continuous flow reactor.

12. The system of claim 1, wherein the control means is automated or manual.

13. The system of claim 1, wherein the conducting polymer is selected from the group consisting of a polyarylamine, a polyarylthiol, a polypyrrole, a polycarbazole, a polyindole, a polyazepine, a polythiophene, a poly (3,4-ethylenedioxythiophene), a poly (3,4-propylenedioxythiophene), and combination(s) thereof.

14. The system of claim 1, wherein the organic stream comprises a polymerizable organic monomer selected from the group consisting of an arylamine, an arylthiol, a pyrrole, a carbazole, an indole, an azepine, a thiophene, a 3,4-ethylenedioxythiophene, a 3,4-propylenedioxythiophene monomer, and combination(s) thereof.

15. The system of claim 14, wherein the conducting polymer is a polyaniline and the polymerizable organic monomer is an aniline.

16. The system of claim 14, wherein the conducting polymer is a poly (3,4-ethylenedioxythiophene) and the polymerizable organic monomer is a 3,4-ethylenedioxythiophene.

17. The system of claim 14, wherein the conducting polymer is a poly (3,4-propylenedioxythiophene) and the polymerizable organic monomer is a 3,4-propylenedioxythiophene monomer.

18. A system for providing a continuous flow process for controlled synthesis of a conducting polymer or salt thereof, comprising:
a temperature controlled continuous flow reactor comprising at least one mixing element, an organic stream, an oxidant stream, and a product stream comprising a conducting polymer, wherein the organic stream comprises a polymerizable organic monomer selected from the group consisting of an arylamine, an arylthiol, a pyrrole, a carbazole, an indole, an azepine, a thiophene, a 3,4-ethylenedioxythiophene, a 3,4-propylenedioxythiophene monomer, and combination(s) thereof, and wherein the temperature controlled continuous flow reactor comprises a temperature effective for synthesizing the conducting polymer, or salt thereof in the product stream;

one or more pumps providing fluidic flow for the organic stream, the oxidant stream, and the product stream;

one or more heat exchangers operatively associated with at least one of the temperature controlled continuous flow reactor, organic stream, oxidant stream, and the product stream; and a temperature control device cooperatively associated with the temperature controlled continuous flow reactor and the one or more heat exchangers, wherein at least one of a concentration, a flow rate, a temperature, a pressure, and a residence time, of the one or more streams, fluidic reactants, sources of fluidic reactants, carrier fluids, or products of the reaction is controlled.

19. The system of claim 18, wherein the conducting polymer comprises a polyaniline and the polymerizable organic monomer comprises an aniline.

20. The system of claim 18, wherein the conducting polymer comprises poly (3,4-ethylenedioxythiophene) and the polymerizable organic monomer comprises 3,4-ethylenedioxythiophene.

* * * * *